(12) United States Patent
Liske et al.

(10) Patent No.: US 11,667,402 B2
(45) Date of Patent: Jun. 6, 2023

(54) LANDING PAD WITH CHARGING AND LOADING FUNCTIONALITY FOR UNMANNED AERIAL VEHICLE

(71) Applicant: Wing Aviation LLC, Mountain View, CA (US)

(72) Inventors: Kyle Liske, Mountain View, CA (US); André Prager, Sunnyvale, CA (US); Nick Renold, Mountain View, CA (US)

(73) Assignee: WING AVIATION LLC, Mountain View, CA (US)

( * ) Notice: Subject to any disclaimer, the term of this patent is extended or adjusted under 35 U.S.C. 154(b) by 308 days.

(21) Appl. No.: 17/014,466

(22) Filed: Sep. 8, 2020

(65) Prior Publication Data

US 2022/0073214 A1    Mar. 10, 2022

(51) Int. Cl.
*B64F 1/36* (2017.01)
*B64C 39/02* (2023.01)
*B64D 9/00* (2006.01)
*B64F 1/32* (2006.01)
*B64U 70/00* (2023.01)
*B64U 101/60* (2023.01)

(52) U.S. Cl.
CPC .............. *B64F 1/362* (2013.01); *B64C 39/02* (2013.01); *B64D 9/00* (2013.01); *B64F 1/322* (2020.01); *B64U 70/00* (2023.01); *B64U 2101/60* (2023.01)

(58) Field of Classification Search
CPC .... B64F 1/362; B64F 1/322; B64C 2201/066; B64C 2201/18; B64C 2201/088
See application file for complete search history.

(56) References Cited

U.S. PATENT DOCUMENTS

| 3,036,797 A | 5/1962 | Augusta |
| 3,904,156 A | 9/1975 | Smith |
| 4,767,144 A | 8/1988 | Hornberg |
| 5,271,128 A | 12/1993 | Storm |

(Continued)

FOREIGN PATENT DOCUMENTS

| CN | 202929383 U | 5/2013 | |
| FR | 3100230 A1 * | 3/2021 | ........... B64C 39/024 |

(Continued)

OTHER PUBLICATIONS

European Patent Office, European Search Report dated May 29, 2020, issued in connection with European Patent Application No. EP 17874317.5, 12 pages.

(Continued)

*Primary Examiner* — Philip J Bonzell
(74) *Attorney, Agent, or Firm* — McDonnell Boehnen Hulbert & Berghoff LLP

(57) ABSTRACT

A landing pad for an unmanned aerial vehicle ("UAV") is disclosed. The landing pad includes a support structure, a charging pad, and a plurality of movable UAV supports. The charging pad is coupled to the support structure and able to move relative to the support structure. The UAV supports are also coupled to the support structure and configured to translate along the support structure from a first position to a second position. When the UAV supports are in the first position, the charging pad supports the UAV. When the UAV supports are in the second position, the charging pad is lowered and the UAV supports then provide support to the UAV.

19 Claims, 17 Drawing Sheets

(56) References Cited

U.S. PATENT DOCUMENTS

| | | | |
|---|---|---|---|
| 5,292,165 A | 3/1994 | Wiklund | |
| 5,634,246 A | 6/1997 | Jermyn | |
| 5,788,186 A | 8/1998 | White | |
| 6,019,314 A | 2/2000 | Craig | |
| 6,056,237 A | 5/2000 | Woodland | |
| 6,334,537 B1 | 1/2002 | Tepper | |
| 6,817,573 B2 | 11/2004 | Harrison et al. | |
| 6,965,816 B2 | 11/2005 | Walker | |
| 7,149,611 B2 | 12/2006 | Beck et al. | |
| 7,574,193 B2 | 8/2009 | Hulkkonen et al. | |
| 7,762,194 B2 | 7/2010 | Gaigler | |
| 7,813,888 B2 | 10/2010 | Vian et al. | |
| 7,877,785 B2 | 1/2011 | Selignan | |
| 8,028,952 B2 | 10/2011 | Umes, Sr. | |
| 8,162,263 B2 | 4/2012 | Wong et al. | |
| 8,511,606 B1 | 8/2013 | Lutke et al. | |
| 8,523,253 B1 | 9/2013 | Yustus | |
| 8,567,044 B2 | 10/2013 | Takeda | |
| 8,862,288 B2 | 10/2014 | Vavrina et al. | |
| 8,899,903 B1 | 12/2014 | Saad et al. | |
| 8,909,391 B1 | 12/2014 | Peeters et al. | |
| 9,056,676 B1 | 6/2015 | Wang | |
| 9,085,362 B1 | 7/2015 | Kilian et al. | |
| 9,174,733 B1 | 11/2015 | Burgess et al. | |
| 9,205,922 B1 | 12/2015 | Bouwer | |
| 9,302,770 B2 | 4/2016 | Burgess et al. | |
| 9,308,994 B2 | 4/2016 | Uskert et al. | |
| 9,346,547 B2 | 5/2016 | Patrick et al. | |
| 9,346,560 B2 | 5/2016 | Wang | |
| 9,384,668 B2 | 7/2016 | Raptopoulos et al. | |
| 9,387,928 B1 | 7/2016 | Gentry et al. | |
| 9,387,940 B2 * | 7/2016 | Godzdanker | B64F 1/12 |
| 9,422,139 B1 | 8/2016 | Bialkowski et al. | |
| 9,481,458 B2 * | 11/2016 | Casado Magaña | B64C 39/024 |
| 9,527,605 B1 | 12/2016 | Gentry et al. | |
| 9,545,852 B2 | 1/2017 | Street | |
| 9,573,684 B2 | 2/2017 | Kimchi et al. | |
| 9,650,136 B1 | 5/2017 | Haskin et al. | |
| 9,676,481 B1 | 6/2017 | Buchmueller | |
| 9,776,835 B2 | 10/2017 | Choudhari et al. | |
| 9,777,502 B2 | 10/2017 | Curlander et al. | |
| 9,783,295 B2 | 10/2017 | Takayama et al. | |
| 9,849,981 B1 | 12/2017 | Burgess et al. | |
| 9,914,539 B1 | 3/2018 | Bar-Zeev et al. | |
| 9,969,494 B1 | 5/2018 | Buchmueller et al. | |
| 10,124,912 B2 | 11/2018 | Walsh et al. | |
| 10,315,764 B2 | 6/2019 | Shannon et al. | |
| 10,418,830 B1 | 9/2019 | Parodi et al. | |
| 10,604,252 B2 | 3/2020 | Blake et al. | |
| 10,647,217 B2 * | 5/2020 | Nishikawa | B65G 39/10 |
| 10,691,142 B2 | 6/2020 | Blake et al. | |
| 10,843,573 B2 * | 11/2020 | Chen | B64F 1/007 |
| 10,934,019 B2 * | 3/2021 | Stamatovski | B64F 1/18 |
| 11,046,459 B2 * | 6/2021 | Stamatovski | B64F 1/007 |
| 11,220,352 B2 * | 1/2022 | Stamatovski | B64F 1/007 |
| 2004/0231112 A1 | 11/2004 | Marcaccio et al. | |
| 2005/0151014 A1 | 7/2005 | McGeer | |
| 2006/0249622 A1 | 11/2006 | Steele | |
| 2007/0049251 A1 | 3/2007 | Mock et al. | |
| 2008/0085732 A1 | 4/2008 | Mizuide et al. | |
| 2009/0009596 A1 | 1/2009 | Kerr et al. | |
| 2009/0278494 A1 | 11/2009 | Randall | |
| 2010/0084513 A1 | 4/2010 | Gariepy et al. | |
| 2010/0256839 A1 | 10/2010 | Fitzpatrick | |
| 2010/0280699 A1 | 11/2010 | Bageshwar et al. | |
| 2011/0084162 A1 | 4/2011 | Goossen et al. | |
| 2011/0128372 A1 | 6/2011 | Malecki et al. | |
| 2011/0130636 A1 | 6/2011 | Daniel et al. | |
| 2011/0192932 A1 | 8/2011 | Brenner et al. | |
| 2011/0267241 A1 | 11/2011 | Grimm et al. | |
| 2011/0281679 A1 | 11/2011 | Larrabee et al. | |
| 2011/0315806 A1 | 12/2011 | Piasecki et al. | |
| 2012/0080556 A1 | 4/2012 | Root, Jr. | |
| 2012/0152654 A1 | 6/2012 | Marcus | |
| 2012/0290226 A1 | 11/2012 | Williams et al. | |
| 2013/0054054 A1 | 2/2013 | Tollenaere et al. | |
| 2013/0193256 A1 | 8/2013 | Hawkes et al. | |
| 2013/0193269 A1 | 8/2013 | Zwaan et al. | |
| 2013/0233964 A1 | 9/2013 | Woodworth et al. | |
| 2013/0238135 A1 | 9/2013 | Fisher | |
| 2014/0032034 A1 | 1/2014 | Raptopoulos et al. | |
| 2014/0124619 A1 | 5/2014 | McGeer et al. | |
| 2014/0124621 A1 * | 5/2014 | Godzdanker | B64F 1/12 244/110 E |
| 2014/0180914 A1 | 6/2014 | Abhyanker | |
| 2014/0263852 A1 | 9/2014 | Walker et al. | |
| 2014/0319272 A1 * | 10/2014 | Casado Magana | B60L 50/52 244/110 E |
| 2015/0063959 A1 | 3/2015 | Saad et al. | |
| 2015/0076287 A1 | 3/2015 | Dula | |
| 2015/0158587 A1 | 6/2015 | Patrick et al. | |
| 2015/0175276 A1 | 6/2015 | Koster | |
| 2015/0183326 A1 | 7/2015 | Ryberg et al. | |
| 2015/0217860 A1 | 8/2015 | Yang | |
| 2015/0239559 A1 | 8/2015 | Uskert et al. | |
| 2016/0001883 A1 | 1/2016 | Sanz et al. | |
| 2016/0023761 A1 | 1/2016 | McNally | |
| 2016/0048131 A1 | 2/2016 | Lesperance et al. | |
| 2016/0059963 A1 | 3/2016 | Burgess et al. | |
| 2016/0144982 A1 | 5/2016 | Sugumaran | |
| 2016/0196756 A1 | 7/2016 | Prakash | |
| 2016/0200438 A1 * | 7/2016 | Bokeno | B60L 53/53 244/2 |
| 2016/0236778 A1 | 8/2016 | Takayama et al. | |
| 2016/0244187 A1 | 8/2016 | Byers et al. | |
| 2016/0257423 A1 | 9/2016 | Martin | |
| 2016/0340006 A1 | 11/2016 | Tang | |
| 2016/0340038 A1 | 11/2016 | Chavez et al. | |
| 2017/0073071 A1 | 3/2017 | Salzmann et al. | |
| 2017/0106978 A1 | 4/2017 | Sopper et al. | |
| 2017/0121023 A1 | 5/2017 | High et al. | |
| 2017/0197718 A1 | 7/2017 | Buchmueller | |
| 2017/0247109 A1 | 8/2017 | Buchmueller et al. | |
| 2017/0313421 A1 | 11/2017 | Gil | |
| 2017/0349283 A1 | 12/2017 | Paunicka et al. | |
| 2017/0355460 A1 | 12/2017 | Shannon et al. | |
| 2018/0072404 A1 | 3/2018 | Prager et al. | |
| 2018/0072417 A1 | 3/2018 | Shannon et al. | |
| 2018/0072418 A1 | 3/2018 | Shannon et al. | |
| 2018/0072421 A1 | 3/2018 | Prager et al. | |
| 2018/0072422 A1 | 3/2018 | Shannon et al. | |
| 2018/0118340 A1 | 5/2018 | Russo | |
| 2018/0141682 A1 | 5/2018 | Blake et al. | |
| 2018/0352988 A1 | 12/2018 | Ortiz et al. | |
| 2019/0135433 A1 | 5/2019 | Goovaerts et al. | |
| 2019/0300202 A1 | 10/2019 | High et al. | |
| 2020/0017237 A1 | 1/2020 | Walker | |
| 2020/0207484 A1 * | 7/2020 | Foggia | B64F 1/36 |
| 2020/0239161 A1 * | 7/2020 | Carthew | B64F 1/32 |
| 2020/0310465 A1 * | 10/2020 | Carthew | B64C 39/024 |
| 2021/0031947 A1 * | 2/2021 | Wankewycz | B64F 1/007 |
| 2021/0047053 A1 * | 2/2021 | Sugimoto | B64F 1/22 |
| 2021/0394930 A1 * | 12/2021 | O'Toole | G05B 15/02 |
| 2022/0017222 A1 * | 1/2022 | Benner | B64C 39/024 |

FOREIGN PATENT DOCUMENTS

| | | | |
|---|---|---|---|
| GB | 158304 | 2/1921 | |
| JP | 10-114489 A | 5/1998 | |
| JP | 3383283 B2 | 3/2003 | |
| KR | 10-2014-0113896 A | 9/2014 | |
| WO | WO 87/04142 | 7/1987 | |
| WO | 2012064891 A2 | 5/2012 | |
| WO | 2013055265 A1 | 4/2013 | |
| WO | 2017053378 A1 | 3/2017 | |
| WO | WO-2018038455 A1 * | 3/2018 | A47G 29/141 |
| WO | WO 2019055685 | 3/2019 | |

OTHER PUBLICATIONS

Lum et al., "Telesurgery Via Unmanned Aerial Vehicle (UAV) with a Field deployable Surgical Robot," Medicine Meets Virtual Reality 155, 2007, 313-315.

(56) References Cited

OTHER PUBLICATIONS

Nguyen et al., "Situation Identification by Unmanned Aerial Vehicle," Institute of Mathematics, 2001, 49-56.
Bone et al., "Unmanned Aerial Vehicles: Background and Issues for Congress," Report for Congress Congressional Research Service, 2003, 1-53.
International Searching Authority, International Search Report and Written Opinion dated Aug. 23, 2018, issued in connection with International Application No. PCT/US2017/050008, filed on Sep. 5, 2017, 9 pages.
International Preliminary Report on Patentability dated Mar. 12, 2019 for International Application No. PCT/US2017/040026, 11 pages.
International Search Report (ISR) for PCT/US2017/040035 dated Sep. 19, 2017, pp. 1-3.
Written Opinion of the International Searching Authority for PCT/US2017/040026 dated Sep. 14, 2017, pp. 1-10.
International Search Report (ISR) for PCT/US2017/040026 dated Sep. 14, 2017, pp. 1-3.
Written Opinion of the International Searching Authority for PCT/US2017/040035 dated Sep. 19, 2017, pp. 1-12.
Various Prior Art references pre-dating Provisional Filing on Sep. 9, 2016, www.gigasense.se/product/safety-hook-is/, 1 page.
PCT International Search Report and Written Opinion, PCT International Application No. PCT/US2017/050025, dated Dec. 20, 2017, 33 pages.
PCT International Search Report and Written Opinion, PCT International Application No. PCT/US2017/048908, dated Nov. 9, 2017, 19 pages.
European Extended Search Report dated Feb. 24, 2020 for European Application No. 17849240.1, 13 pages.
PCT International Search Report and Written Opinion, PCT International Application No. PCT/US2017/049199, dated Nov. 17, 2017, 20 pages.
International Search Authority, International Search Report and Written Opinion dated May 31, 2018, Issued in connection with International Patent Application No. PCT/US2017/057630, filed on Oct. 20, 2017, 19 pages.
Australian Examination Report No. 1 dated Nov. 27, 2019 for Australian Patent Application No. 2017324059, 4 pages.
Hern, Alex, "DHL launches first commercial drone 'parcelcopter' delivery service," The Guardian, https://www.theguardian.com/technology/2014/sep/25/german-dhl-launches-first-commercial-drone-delivery-service, Sep. 25, 2014, 3 pages.
Thielman, Sam, "Congress warned that drones present 'a nightmare scenario for civil liberties'," The Guardian, https://www.theguardian.com/technology/2015/june/17/congress-drones-nightmare-scenario-for-civil-liberties, Jun. 17, 2015, 4 pages.
France-Presse, Agence, "Switzerland begins postal delivery by drone," The Guardian, https://www.theguardian.com/technology/2015/jul/08/swiss-post-begins-testing-postal-delivery-by unmanned-drone, Jul. 7, 2015, 3 pages.
Roberts et al., "Amazon dismayed by proposed FAA rules on commercial use of drones," The Guardian, https://www.theguardian.com/world/2015/feb/15/amazon-faa-rules-commercial-use-drones, Feb. 15, 2015, 3 pages.
Gigasense Automatic Hook, Gigasense, 2016, 2 pages.
Standalone quadrocopter with charging station, Autonomous drone with charging docking station from Copter Express, Jun. 2017, COEX, Youtube, 48-51 seconds, https://www.youtube.com/watch?v=RjX6nUqw1ml.

\* cited by examiner

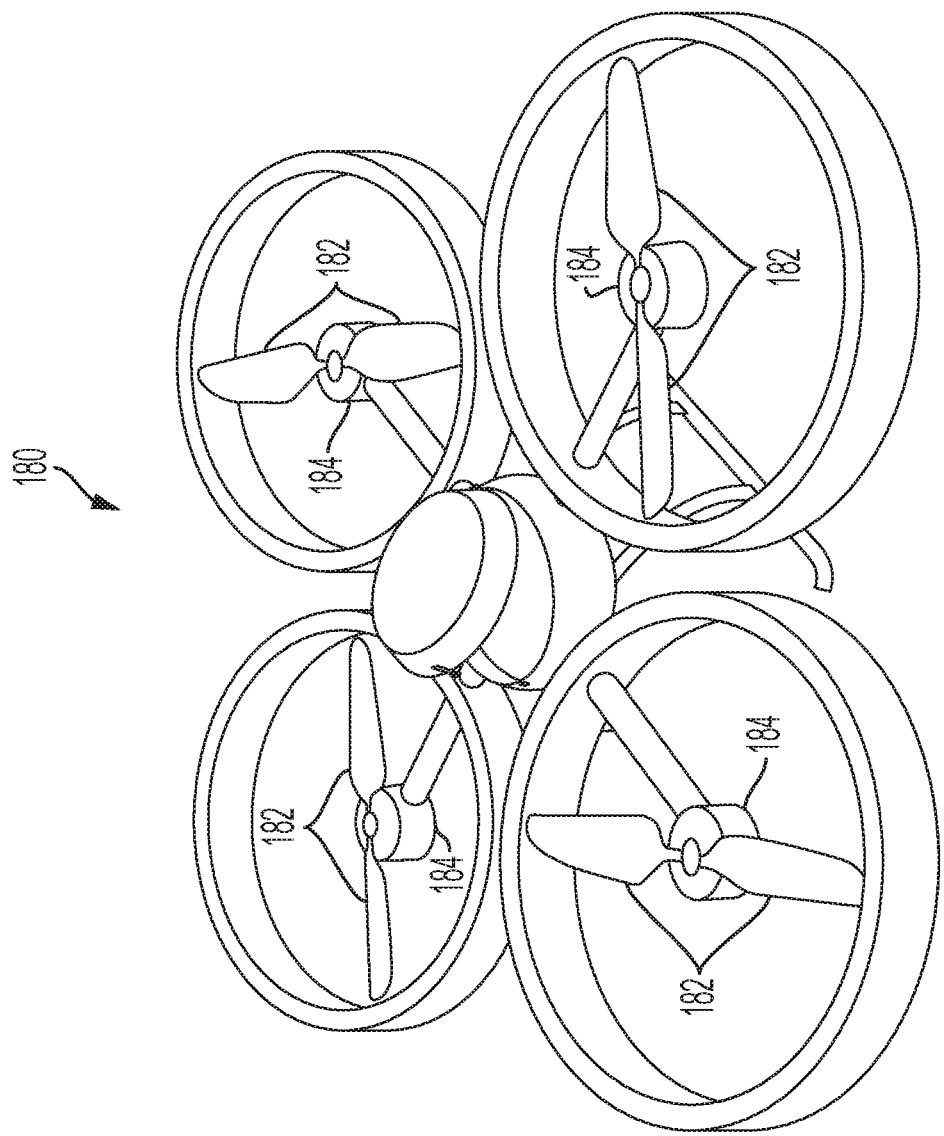

LANDING PAD WITH CHARGING AND LOADING FUNCTIONALITY FOR UNMANNED AERIAL VEHICLE

BACKGROUND

An unmanned vehicle, which may also be referred to as an autonomous vehicle, includes a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter unmanned aerial vehicles, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

Unmanned aerial vehicles (UAVs) may be used to deliver a payload to, or retrieve a payload from, an individual or business. Additional systems at the point of delivery or pick-up are helpful for users, workers, merchants and others to utilize and interact with UAVs. Other helpful systems may be at a central location where UAVs are stored and/or co-located with merchants. Loading/unloading systems and structures that facilitate safe and efficient delivery and/or pick-up of payloads, while also providing charging capabilities to the UAVs are disclosed herein.

SUMMARY

The present application discloses landing pads for an unmanned aerial vehicle ("UAV"), as well as related systems and methods. The landing pad is part of a payload loading/unloading system that may also provide charging and other services to a UAV. UAVs are increasingly utilized for a wide array of delivery services and as such, dedicated structures that increase the ease of use, efficiency, reliability, and safety of such delivery services is necessary. Some UAVs utilize contact-based charging in order to charge their batteries. For example, as described in U.S. Patent Publication No. 2019/0023133 (U.S. patent application Ser. No. 15/654,644), which is hereby incorporated by reference, an electrically conductive landing pad transfers electric power to one or more UAV batteries via electrical contacts within the UAV. However, in order to load, unload, and/or otherwise service the UAV, access to the underside of the UAV may be required. Beneficially, some examples described herein include a landing pad designed to not only charge a UAV, but also to provide access to the underside of the UAV for loading and unloading of payloads along with allowing for other services that require similar access to the vehicle.

Example landing pads and related systems described herein may be installed on freestanding support structures, may be installed on or within existing structures such as building walls, rooftops, trucks, lamp posts, cell towers, warehouses, etc., or may be installed by modifying an existing structure with aspects described herein. Beneficially, example landing pads and related systems described herein may be installed in a variety of locations without impeding everyday life of merchants, customers, or other people, while increasing the efficiency of access to UAV delivery service to the same merchants, customers, or other people.

In one embodiment, a landing pad for a UAV is described. The landing pad includes a support structure, a charging pad, and a plurality of UAV supports. The support structure may be freestanding or may be connected to another structure. The charging pad includes a plurality of electrical contacts that are configured to transfer power to a UAV. Moreover, the charging pad is configured to move relative to the support structure. In some examples, more than one charging pad are contemplated, and the one or more charging pads may be considered to be hinged to the support structure. The UAV supports are coupled to the support structure. In some embodiments, the UAV supports include a motor, a pair of gears or wheels, and a roller/bar. The gears or wheels are driven by the motor, and move along the support structure. The UAV supports are configured to translate across the landing pad, and more particularly the support structure from a first position to a second position. When in the first position, the UAV supports provide the UAV access to the charging pad. Further, when the UAV supports are in the first position the charging pad supports the UAV. But when the UAV supports are in the second position, the UAV supports provide support to (e.g., maintain a vertical position of), the UAV.

In another embodiment, a method is described. The method includes supporting a UAV above a ground surface by a charging pad of a landing pad. The method also includes a plurality of UAV supports moving across the landing pad towards the UAV. Each of the UAV supports moves in a different direction in approaching the UAV. After the UAV supports move towards the UAV, and in some examples, after coming into contact with the UAV, the method includes moving the charging pad away from the UAV such that the UAV is no longer supported by the charging pad but is instead supported by the UAV supports. The method may further include providing access to the underside of the UAV while the charging pad is away from the UAV and the UAV is being supported by the UAV supports. In some embodiments, the method includes other aspects including landing the UAV, charging the UAV, and loading a payload to the UAV, among others.

In yet another embodiment, a system is provided. The system includes a UAV and a landing pad. The UAV includes a fuselage and a retractable tether. A payload coupling apparatus is connected to a distal end of the tether, while the proximate end of the tether is connected to the UAV. In some examples, the proximate end of the tether is connected to a winch system of the UAV. The landing pad of the system includes a support structure, a charging pad, and a plurality of UAV supports. The charging pad includes a plurality of electrical contacts that are configured to transfer power to a UAV. Moreover, the charging pad is configured to move relative to the support structure. The UAV supports are coupled to the support structure. The UAV supports translate across the landing pad, and more particularly the support structure from a first position to a second position. When in the first position, the UAV supports provide the UAV access to the charging pad. Further, when the UAV supports are in the first position the charging pad supports the UAV. But when the UAV supports are in the second position, the UAV supports provide support to (e.g., maintain a vertical position of), the UAV.

In further embodiments, any type of system or device could be used or configured as a means for performing functions of any of the methods described herein (or any portions of the methods described herein). For example, a system for landing, charging, supporting, loading, and/or unloading a UAV includes means to land, charge, support, load, and/or unload the UAV.

These as well as other aspects, advantages, and alternatives will become apparent to those of ordinary skill in the art by reading the following detailed description, with reference where appropriate to the accompanying drawings. Further, it should be understood that the description provided in this summary section and elsewhere in this document is intended to illustrate the claimed subject matter by way of example and not by way of limitation

BRIEF DESCRIPTION OF THE DRAWINGS

FIG. 1E is a simplified illustration of a UAV, according to an example embodiment.

DETAILED DESCRIPTION

Figure 1A:
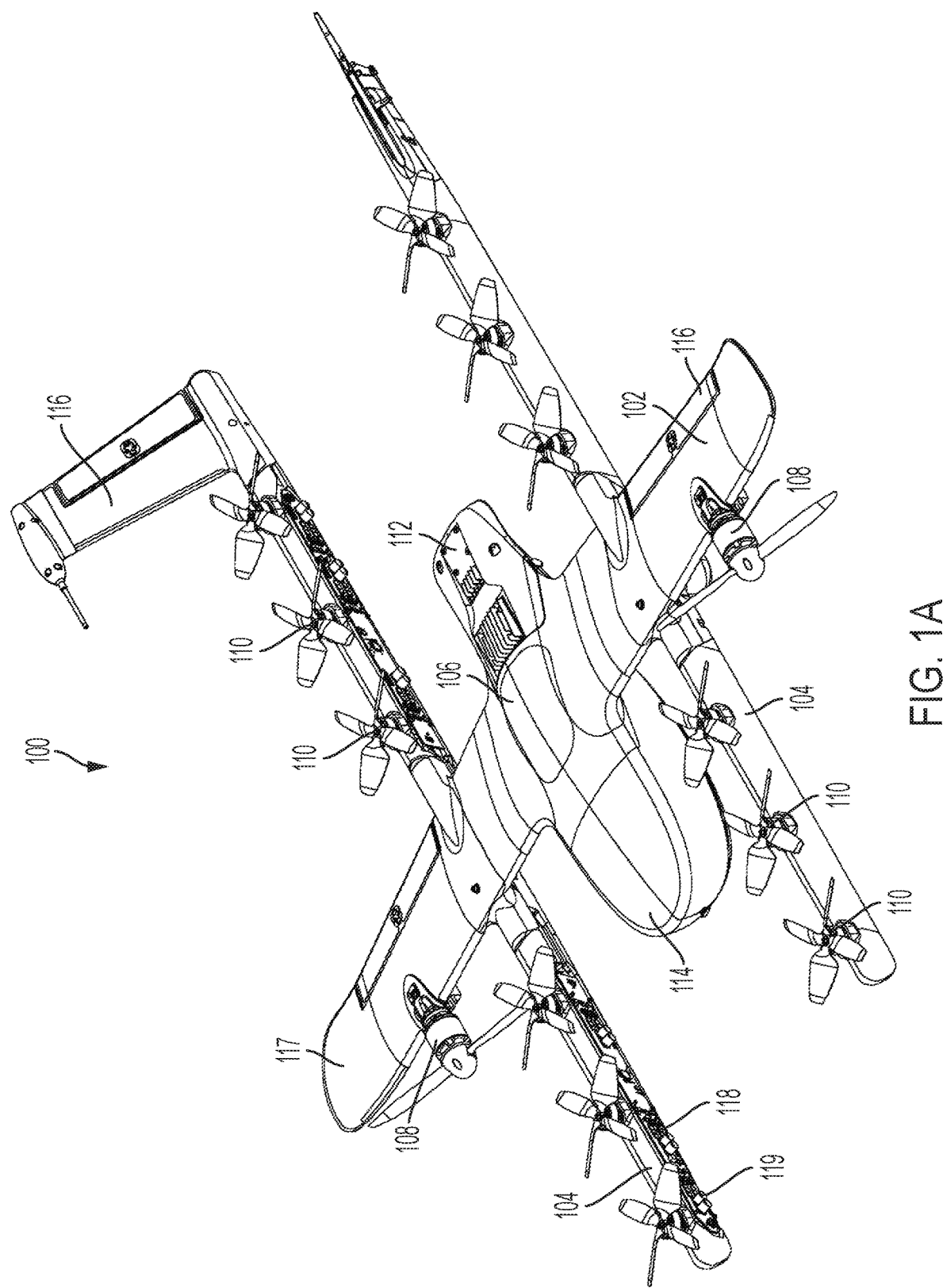
FIG. 1A is a simplified illustration of an unmanned aerial vehicle (UAV), according to an example embodiment.

Example methods, systems, and devices are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

The embodiments described herein relate to landing pads for unmanned aerial vehicles ("UAVs"). The landing pads described herein may be part of a payload loading structure or system, such as those described in U.S. Pat. No. 10,604,252, which is hereby incorporated by reference. Aspects written in terms of "loading," such as a payload loading structure, should be understood to not be limited to "loading" functions or scenarios only. For example, unloading, maintenance, charging, and other interactions between a user, a UAV, a payload loading structure, and/or related components may occur at a payload loading structure or aspect thereof.

Exemplary embodiments may include, be implemented as part of, or take of the form of an aerial vehicle or system related thereto. In example embodiments, a UAV may include rotor units operable to provide thrust or lift for the UAV for transport and delivery of a payload. Herein, the terms "unmanned aerial vehicle" and "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

UAVs are increasingly being utilized to retrieve, carry, and deliver payloads across a variety of industries. As such, infrastructure is needed at pick-up and drop-off locations so that merchants, customers, and other users can utilize UAV delivery services. More particularly, payload loading systems may provide known, accessible, dedicated, and safe areas for a person or other device utilizing a UAV delivery service to load or unload a payload. Payload loading systems may include a landing pad (which may also be considered a landing platform).

UAVs depend on battery power in order to carry-out various operations. Rather than having separate charging structures/stations and payload loading structures, advantageously, a landing pad that has charging capabilities but also provides access to the underside of the UAV as part of a single apparatus, is described herein. Charging, or recharging is accomplished via contact between a charging pad and electrical contacts on the body of the UAV. In addition to recharging a battery, a charging pad included as part of a landing pad may provide the means for the UAV to complete other tasks, such as uploading or downloading information from a network, among other possibilities. By also providing access to the underside of the UAV, the UAV is able to deploy its tether, pick-up (or drop-off) a payload (or package), or otherwise be serviced. Other UAVs may depend on another fuel source for power, and refueling of that fuel is contemplated within the scope of this disclosure.

In order to provide access to the underside of the UAV, the landing pad includes a charging pad and a support structure, and the charging pad may move away from the support structure. In some regards, the charging pad may move similar to a "trapdoor" or other doors orientated horizontally such that something passes through vertically. In order to still support the UAV, the landing pad also includes movable supports that maintain the UAV's position above the ground, but still provide access to the underside of the UAV once the charging pad has moved away. While the UAV could hover above the open cavity left behind after the charging pad moves away from the UAV, by using other supports, beneficially, the UAV's battery life is saved.

Beneficially, landing pads as part of payload loading structures, as described, may provide more people with access to UAV delivery services. Additionally, landing pads described herein may reduce the risk of injury to humans by increasing the distance between the UAV and the point of interaction (i.e., loading and unloading of a payload at a target location, replacing batteries, etc.) and providing access to the underside of the UAV when moving components (e.g., propellers) may be on a topside of the UAV. Moreover, inherent features of the landing pads described may allow for installation of such systems (or related devices and components thereof) in a variety of locations without impeding everyday life of people.

The Figures described in detail below are for illustrative purposes only and may not reflect all components or connections. Further, as illustrations the Figures may not reflect actual operating conditions, but are merely to illustrate embodiments described. Further still, the relative dimensions and angles in the Figures may not be to scale, but are merely to illustrate the embodiments described.

II. ILLUSTRATIVE UNMANNED VEHICLES

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
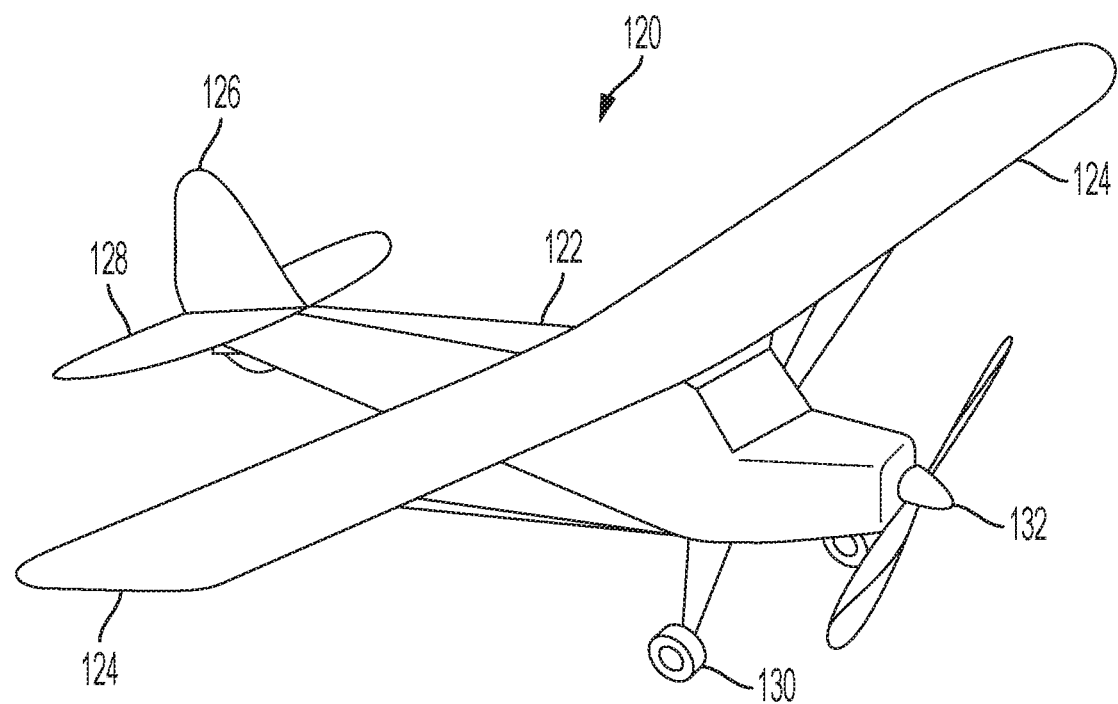
FIG. 1B is a simplified illustration of a UAV, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
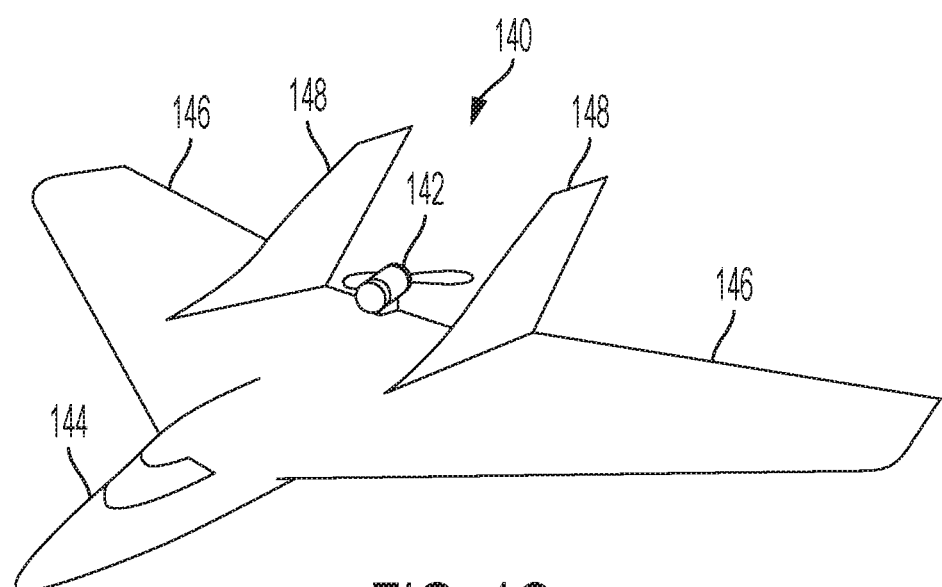
FIG. 1C is a simplified illustration of a UAV, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
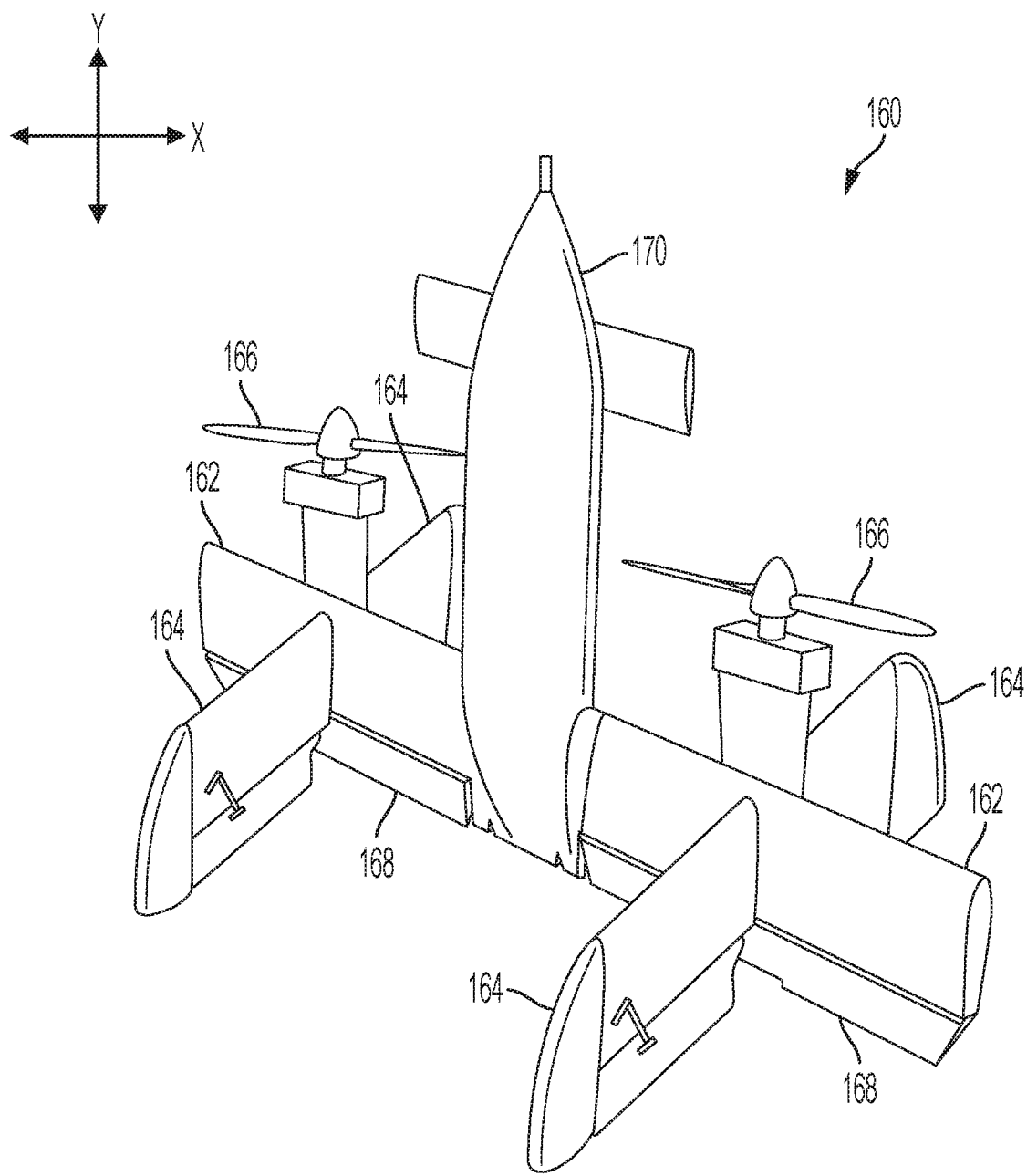
FIG. 1D is a simplified illustration of a UAV, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
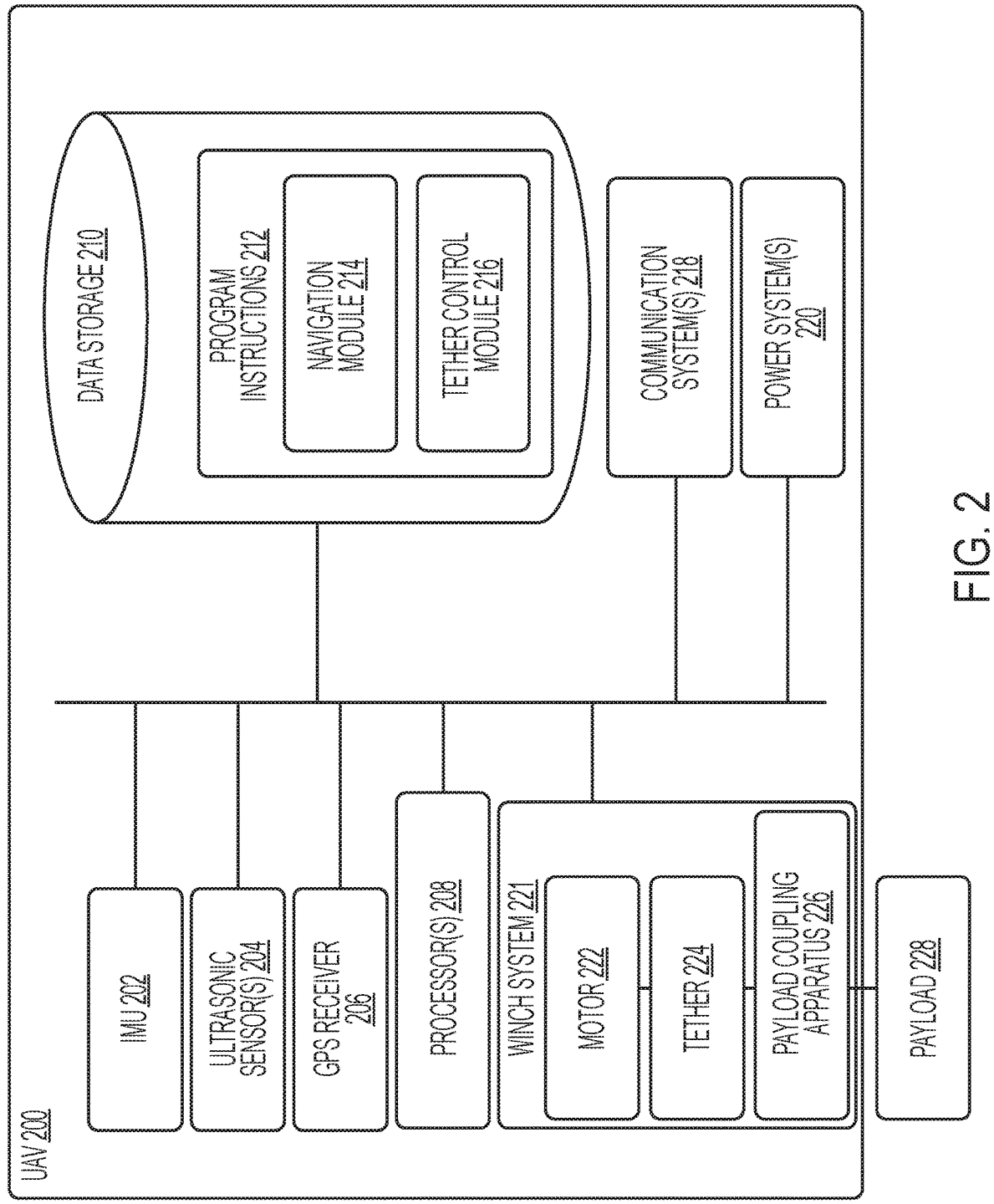
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

In some embodiments, the control system 1120 may take the form of program instructions 212 and the one or more processors 208.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

Figure 3:
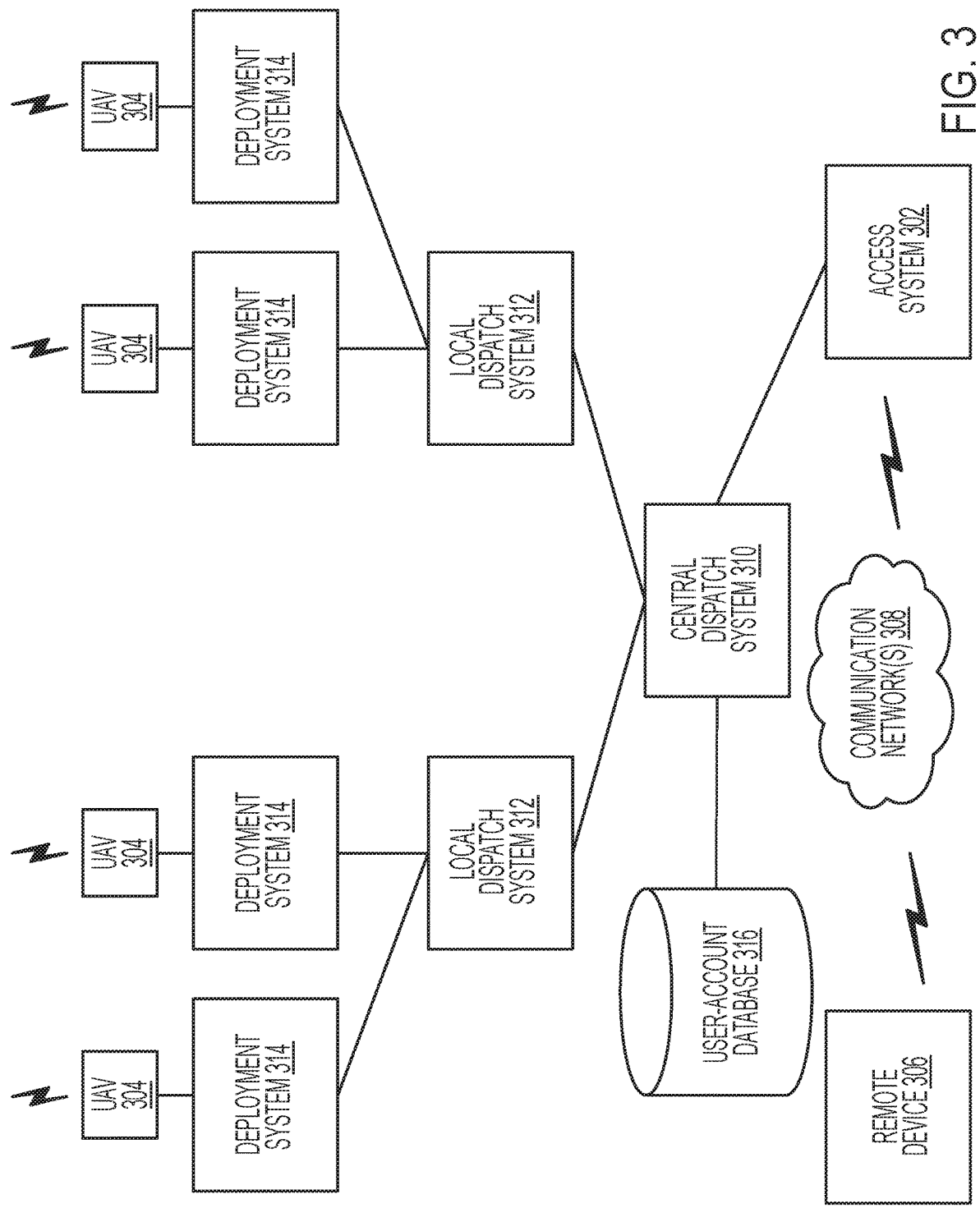
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. ILLUSTRATIVE LANDING PADS AND LANDING PAD SYSTEMS

Figure 4:
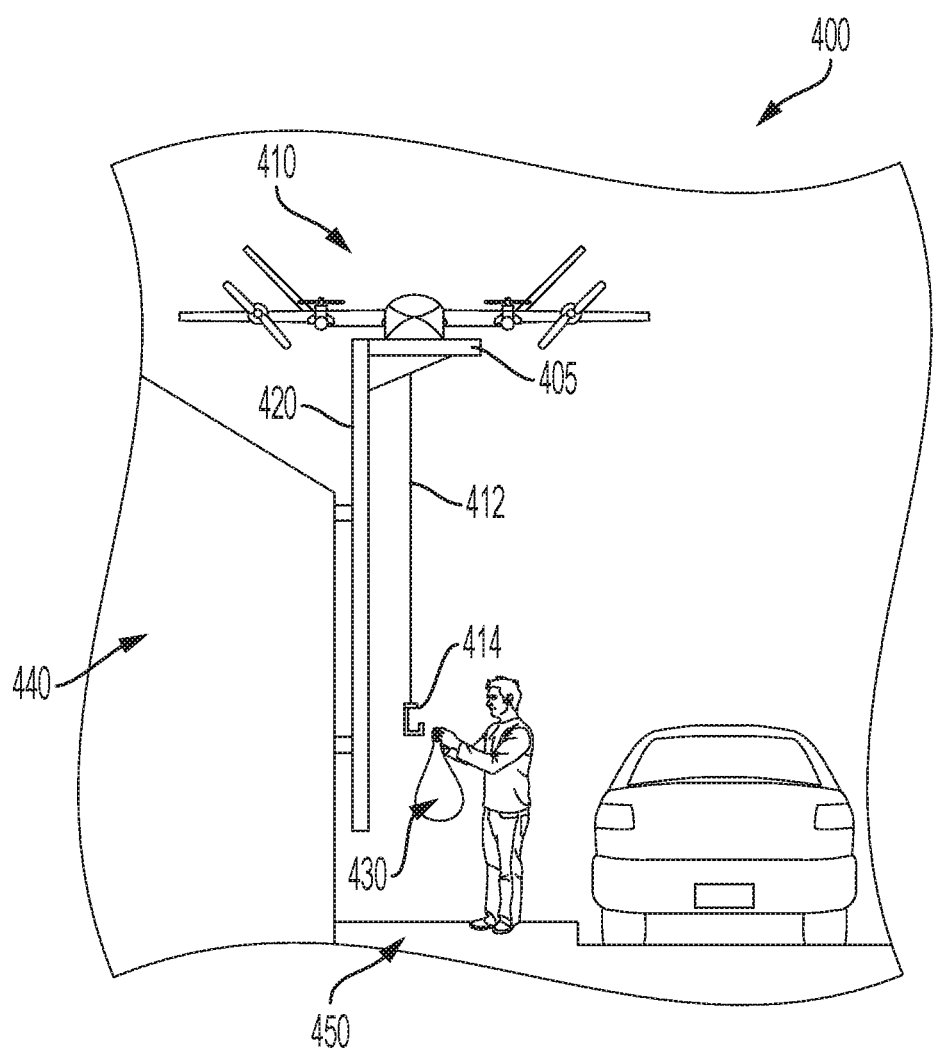
FIG. 4 illustrates a payload loading system, according to an example embodiment.

FIG. 4 illustrates a payload loading system 400. The payload loading system 400 includes a landing pad 405. A UAV 410 may land on, takeoff from, and/or hover over the landing pad 405 when operating a delivery service. The landing pad 405 may be coupled to a landing pad support structure 420. The delivery service may include pick-up, or drop-off, of a payload 430. The UAV 410 includes a retractable tether 412 and a payload coupling apparatus 414. The tether 412 and the payload coupling apparatus 414 may be located within the UAV 410, such as within a fuselage of the UAV 410. The payload coupling apparatus 414 may couple to the payload 430 during the delivery service.

The UAV 410 may be similar to the UAVs described in FIGS. 1A-1E, FIG. 2, and FIG. 3 above. The UAV 410 includes components not depicted in FIG. 4. For example, the UAV 410 may further include a winch system. The winch system may be similar to winch systems described above, including winch system 221 of FIG. 2, for example. The winch system may include the tether 412. Other components of the UAV 410 may be similar in form and function as components described as part of the UAVs described in FIGS. 1A-1E.

The UAV 410 is coupled to a proximate end of the tether 412. Moreover, the proximate end of the tether 412 may be coupled to the winch system of the UAV 410. The payload coupling apparatus 414 is coupled to the retractable tether 412 at a distal end of the tether 412. The payload 430 is coupleable to the tether 412 at the payload coupling apparatus 414.

In some instances, the landing pad 405 may include a charging pad. Moreover, the landing pad 405 may be on top of the landing pad support structure 420. As depicted in FIG. 4, the landing pad support structure 420 is coupled to a building 440 and supports the landing pad 405 above a ground surface 450. In this regard, the landing pad 405 and landing pad support structure 420 may be configured to support the UAV 410 such that there is a safe amount of space between the UAV 410 and a user of the delivery service. While the landing pad support structure 420 is coupled to the building 440 in FIG. 4, the landing pad support structure 420 may be freestanding in other instances. Moreover, the landing pad support structure 420 may couple the landing pad 405 to an existing structure for support. Existing support structures that the landing pad 405 may be coupled to include buildings, awnings, lamp posts, mail boxes, restaurants, houses, flag poles, cars, trucks, vehicles, etc. In some embodiments, the landing pad 405 may be elevated above the ground surface 450, while in other instances the landing pad 405 may be at or near the ground surface 450.

The landing pad 405 may be attached to a local electrical grid and/or a network in some embodiments. In some instances, the landing pad 405 may be attached to a solar panel or other independent power source rather than the local electrical grid. In some examples, the landing pad 405 may be attached to a local electrical grid and/or a network via the landing pad support structure 420. As such, the landing pad 405, for example via a component such as a charging pad, may provide electrical power to the UAV and support the uploading/downloading of data.

When delivering the payload 430, the UAV 410 may pick up the payload 430 from a warehouse, a storefront, a restaurant, or a user of the delivery service. The payload 430 is coupled to the payload coupling apparatus 414. The payload coupling apparatus 414 includes means for attaching the payload 430, for example, as described in U.S. Patent Publication No. 2018/0072420 (U.S. patent application Ser. No. 15/389,074), which is hereby incorporated by reference.

Upon reaching the destination, the UAV 410 may land on the landing pad 405 and pay out the tether 412. The tether 412 is coupled to the UAV 410 at a first end and the payload coupling apparatus 414 at a second end. The payload 430 may reach a target location. The target location is a three-dimensional space that is easily accessed by a user, such as a consumer or merchant. In some embodiments, the target location is at an ergonomic position for a user to load or unload the payload 430. Once the payload 430 reaches the target location, the payload 430 is unloaded from the payload coupling apparatus 414. A user, merchant, robot, or other entity may unload the payload 430. When the payload 430 is unloaded to the payload coupling apparatus 414, one or more sensors on the UAV 410 may detect a decrease in tension in the tether 412. At this time, another payload may be loaded onto the payload coupling apparatus 414. After unloading the payload 430, the UAV 410 may reel in the tether 412.

In other examples, rather than dropping off the payload 430, the UAV 410 may pick up and load the payload 430 after landing on the landing pad 405. After landing, the UAV 410 may pay out the tether 412 such that the payload coupling apparatus 414 reaches the target location where the payload 430 can be coupled to the payload coupling apparatus 414. The tether 412 may then reel in the tether 412 including the payload 430.

In some examples, the loading/unloading process may include reeling in/paying out the tether 412, payload coupling apparatus 414, and possibly the payload 430 through a cavity in the landing pad 405. U.S. Pat. No. 10,604,252, incorporated by reference, more fully describes passing the tether 412 and the payload coupling apparatus 414 through a cavity. In other examples, the loading/unloading process may not involve reeling in or paying out the tether 412, and instead the payload 430 may be directly coupled to (e.g., clipped to) the UAV 410 or the payload 430 may be loaded into a cavity of the fuselage of the UAV 410. For example, a consumer may be able to reach the underside of UAV 410 directly and use of a tether would not be necessary. In such examples, the UAV 410 may not include a tether or winch systems. In yet other examples, a conveyor or elevator or other means for transporting the payload 430 to/from the UAV 410 are considered.

The payload loading system 400 may further include other features, such as notifying a user when the UAV 410 has arrived to pick-up (or drop-off) the payload 430. In some embodiments, the payload loading system 400, including the landing pad support structure 420 may include a user interface to assist the user in preparing for delivery or pick-up. For example, a merchant may enter an address or other user information into the payload loading system 400 such that the UAV 410 is provided with relevant information to carry out the delivery of the payload 430. In other examples, the payload loading system 400 or an operator thereof may be notified that the UAV 410 is charged and ready to receive the payload 430. In such examples, the UAV 410's preparedness may be indicated via an indicator lamp, the payload coupling apparatus 414 being lowered, or a software signal to a payload-aircraft assignment/dispatching system, among other examples.

As depicted in FIG. 4, the UAV 410 has landed on the landing pad 405. While landed, the UAV 410 may charge or replace batteries, and/or communicate with other aspects of a UAV system. Additionally, while landed, the UAV 410 may wait for a user or other device to load (or unload) the payload 430 onto the payload coupling apparatus 414. In some examples, loading the payload 430 may occur after charging the UAV 410 is completed. At least one advantage of the payload loading system 400 being configured to support the landing of the UAV 410 is that loading the payload 430 while the UAV 410 is landed saves battery energy of the UAV 410.

Figure 5:
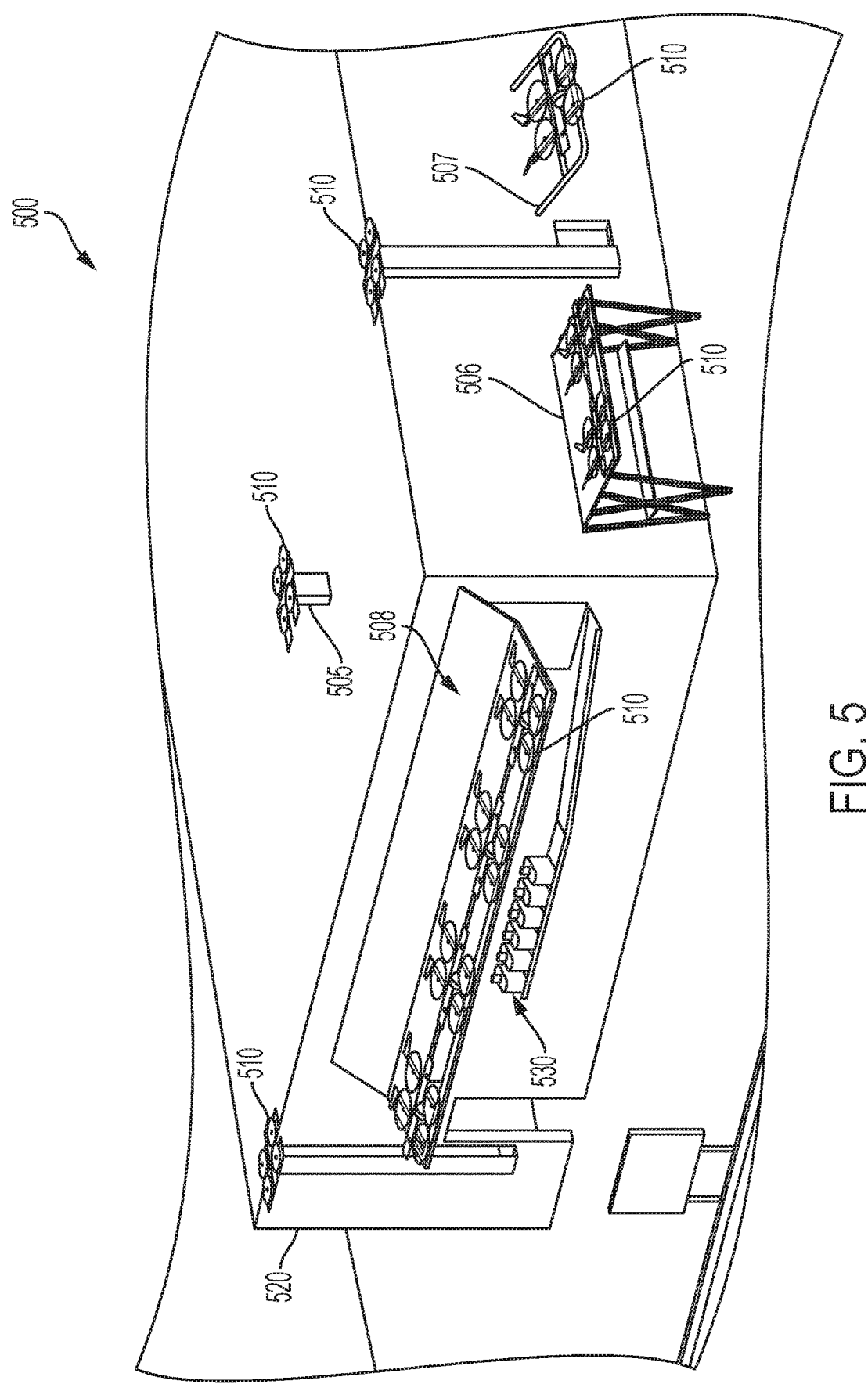
FIG. 5 illustrates payload loading systems, including example landing pads, installed in various ways on a building structure, according to an example embodiment.

FIG. 5 illustrates a payload loading system 500 that includes a roof landing pad 505, a first awning landing pad 506, a cantilevered landing pad 507, and a second awning landing pad 508. As shown in FIG. 5, a plurality of UAVs 510 may land on one or more of the landing pads described herein. The landing pads are coupled to a building 520. In some instances, the landing pads in FIG. 5 are coupled to the building 520 via a support structure, such as the landing pad support structure 420 in FIG. 4, among other examples.

As illustrated in FIG. 5, the payload loading system 500 including landing pads may be a structure as part of a building or warehouse. Within examples, landings pads are coupled to, or included as part of a merchant module. The merchant module may include a warehouse or distribution center. A merchant may sell or execute deliveries out via a UAV delivery system out of the merchant module including the landing pads. Although the landing pads are shown on the outside of the building 520, it should be noted that the landing pads could also be installed inside the building 520 and UAVs could travel in and out of the building 520.

While FIG. 5 depicts the building 520 and is generally considered part of a merchant module, it is also considered herein that other structures, including trucks, residences, stores, and other common structures in a community may be designated as a location where UAV delivery service may be desirable and thus a corresponding payload loading system including one or more landing pads may be installed. As shown in FIG. 5, the landing pads described herein may be installed in a variety of ways to existing and new structures. Such structures may be dedicated to delivery services, or may be fitted to include a landing pad in a convenient location for a network of UAVs. Other similar design considerations are contemplated.

More particularly, FIG. 5 depicts the roof landing pad 505. The roof landing pad 505 may be installed on a roof of the building 520 and payloads may pass through an opening, a cavity, or a window of the building 520. FIG. 5 also depicts the first awning landing pad 506 that is arranged over a window in the building 520. Merchants or customers may interact with the UAV 510 via the window under the first awning landing pad 506. Similarly, FIG. 5 depicts the cantilevered landing pad 507. The cantilevered landing pad 507 may be directly coupled to the building 520 and, being cantilever off of the building 520, the cantilevered landing pad 507 may support the entirety of the landing pad and any UAVs 510 landed thereon. Merchants or customers may interact with the UAVs 510 on the cantilevered landing pad 507 by walking under the landing pad. The second awning landing pad 508 is another example embodiment. A payload 530 may be made available by a merchant for pickup by one of the UAVs 510. The payload 530 may be loaded onto the UAVs 510 by a person or machine upon being prepared for delivery by the UAVs 510.

While FIG. 5 depicts various landing pads installed on and as part of the building 520, other implementations are considered herein. For example, landing pads described herein may be portable and/or may be used independent of any other support. In other examples, landing pads may be installed as part of systems not otherwise depicted. For example, in another embodiment landing pads with charging capabilities may be built into a floor of an upper level of a hanger or warehouse. Operators and package loading may occur below on a lower level while the UAVs are on the upper level. Movable charge pads as part of the landing pads could be built into the floor structure itself. Other implementations of the landing pad described herein will become apparent to a person of skill in the art.

Continuing with the Figures, FIGS. 6A-6G depict a landing pad 600, according to an example embodiment. The landing pad 600 including a charging pad 605, a support structure 620, and a plurality of UAV supports 630A, 630B, 630C, and 630D. The charging pad 605 may include a plurality of electrical contacts 607. One or more hinge(s) 609 may couple the charging pad 605 to the support structure 620. A UAV 610 includes a retractable tether 612 (see FIG. 6E) and a payload coupling apparatus 614 (see FIG.

6E). The payload coupling apparatus 614 may couple to a payload 616 (see FIG. 6F). The UAV 610 may also include a fuselage 618. The support structure 620 may include a track 622. Each of the UAV supports 630A-D include a roller 632A-D, a gear 634A-D, and a motor 636A-D, respectively.

Figure 6A:
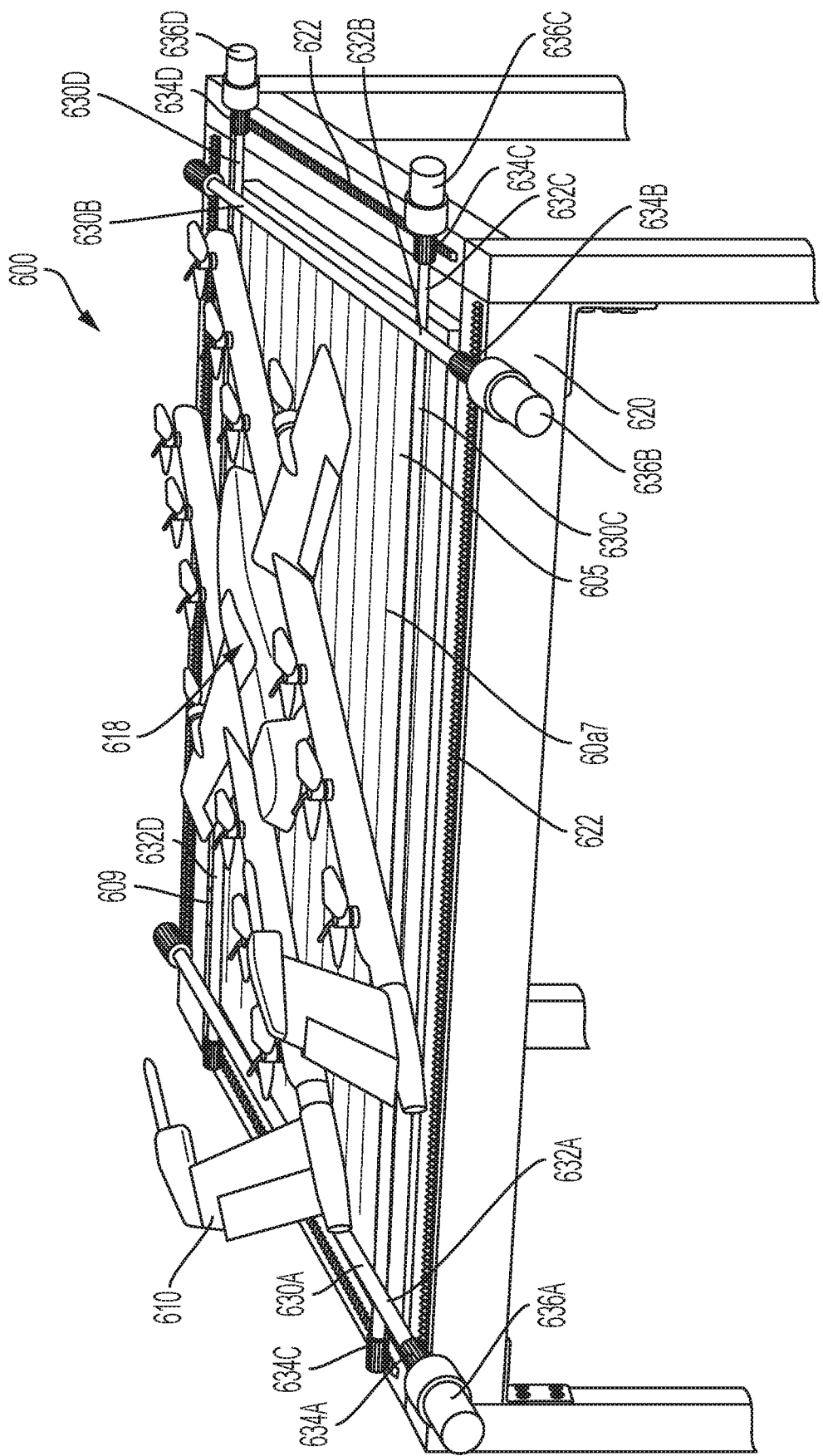
FIG. 6A illustrates a UAV on a landing pad, according to an example embodiment.

FIG. 6A depicts the UAV 610 on the landing pad 600, according to an example embodiment. More particularly, the UAV 610 is on the charging pad 605 of the landing pad 600. In some examples, electrical power is transferred from the charging pad 605 to the UAV 610 via the electrical contacts 607. The charging pad 605 may be coupled to an electrical grid in order to recharge batteries within the UAV 610. The UAV 610 may include a plurality of contacts that receive electrical power from the landing pad 600, and more particularly the charging pad 605. In some embodiments, the fuselage 618 of the UAV 610 may be in electrical communication with the charging pad 605. The charging pad 605 may also facilitate data communication between the UAV 610 and a network or server via the electrical contacts 607.

In other examples, the UAV supports 630A-D may include one or more electrical contacts in addition to or instead of the electrical contacts 607. Electrical contacts on the UAV supports 630A-D may otherwise function the same as the electrical contacts 607, but be located as part of the UAV supports 630A-D, including but not limited to being part of the roller 632A-D component. In some such examples, the charging pad 605 may not include electrical contacts 607 and may no longer be a charging pad and just physically support the UAV 610 as described herein. Instead or in addition to electrical contacts, the pad may include additional visual indicators identifying the pad location. In other examples where both the charging pad 605 includes the electrical contacts 607 and the the UAV supports 630A-D include one or more additional electrical contacts, the UAV 610 may continue to charge and/or exchange information via the electrical contacts of the UAV supports 630A-D after the charging pad 605 has moved away from the UAV 610 (see FIG. 6D).

As shown in FIG. 6A, the charging pad 605 supports the UAV 610 by being in contact with a portion of the UAV 610, for example the fuselage 618 of the UAV 610. In some embodiments, the UAV 610 may have just landed at the landing pad 600 in order to recharge batteries of the UAV 610 and/or pick-up/drop-off a payload. The support structure 620 may be coupled to or integrated within a building, truck, or other structure in order to support the landing pad 600 and the UAV 610. The support structure 620 may be constructed from metal, wood, or other suitable materials. In some examples, a portion of the support structure 620 may encompass and/or surround the charging pad 605 when the charging pad 605 is supporting the UAV 610.

As described in further detail below (see FIG. 6D), at least a portion of the charging pad 605 is configured to move relative to the support structure 620. For example, in FIG. 6A, the charging pad 605 may be considered in-plane with a top portion of the support structure 620. However, the charging pad 605 may be rotatably coupled to the support structure 620, for example, via the one or more hinges 609. In some aspects, the charging pad 605 may move relative to the support structure 620 in order to expose and provide access to an underside of the UAV 610. Particularly, moving the charging pad 605 may provide access to the fuselage 618, tether 612, payload coupling apparatus 614, and/or one or more batteries of the UAV 610.

In FIG. 6A, the UAV supports 630A-D are in a first position. When in the first position, the UAV supports 630A-D are along the periphery of the charging pad 605. In some embodiments, when in the first position, the UAV supports 630A-D may be aligned with or overlapping a portion of the support structure 620. The UAV 610 may land on the landing pad 600, or the charging pad 605, when the UAV supports 630A-D are in the first position. Moreover, when in the first position, the UAV supports 630A-D provide the UAV 610 access to the charging pad 605. Further, when the UAV supports 630A-D are in the first position, the charging pad 605 supports the UAV 610. In some cases, supporting the UAV 610 includes supporting the weight of the UAV 610 and/or maintaining a vertical position of the UAV 610 relative to a ground surface.

Each of the UAV supports 630A-D are coupled to the support structure 620. While four UAV supports 630A-D are shown, it should be understood that more and less than four UAV supports are contemplated herein. The UAV supports 630A-D are movably coupled to the support structure 620. In some examples, UAV supports 630A-D are movably coupled to the support structure 620 via the track 622.

The UAV support 630A are described herein, but it should be understood that the other UAV supports 630B-D may include components referenced similarly that have similar form and function as the components of the UAV support 630A.

The UAV support 630A includes the motor 636A, the gear 634A, and the roller 632A. The UAV support 630A may also include a second gear on the opposite side of the roller 632A from the gear 634A. Thus the roller 632A may be between two gears, for example. The motor 636A may drive the gear 634A to rotate and move along the track 622. The gear 634A moves along the track 622 such that the roller 632 rolls and/or translates across the landing pad 600, the charging pad 605, and the support structure 620. In other examples, the gear 634A may include a wheel and run along a portion of the support structure where the track 622 is located in FIG. 6A.

The motor 636A may be wired to the electrical power of the landing pad 605 including the support structure 620 and the charging pad 605. Moreover, the roller 632A may be considered a bar or a rod. In some regards, the roller 632A is configured to roll or move across at least a portion of the support structure 620 and/or the charging pad 605. The roller 632A may have a cylindrical shape and may span the charging pad 605. The gear 634A may interface and correspond with the track 622 of the support structure 620. Moreover, the gear 634A may support the roller 632A.

While depicted and described above as cylindrical and the rollers 632A-D, it is contemplated that in other examples the rollers 632A-D may not roll but only translate across the support structure 620. Moreover, instead of the rollers 632A-D, non-round and/or non-rolling support bars are considered. The shape of the rollers 632A-D may vary based on various other parameters including the location of the corresponding landing pad in the environment as well as the specific function of those rollers 632A-D in a specific embodiment. For example, in some cases it may be advantageous to have a flat surface as part of the UAV supports 632A-D, and thus cylindrical roller bars may not be used. Other examples will be apparent to one of skill in the art without departing from the scope of the invention.

The track 622 may be located along one or more of a top surface or top edge of the support structure 620. In some cases, there may be four tracks, one on each side of a square or rectangular support structure 620.

As depicted, the UAV supports 630A and 630B may both move across the landing pad 600 in opposite directions along the same track 622. Similarly, the UAV supports 630C and 630D may also both move across the landing pad 600 in opposite directions. As provided in more detail herein, the UAV supports 630A and 630B may be arranged perpendicular or nearly perpendicular to the UAV supports 630C and 630D. As such, in some examples, the UAV supports 630A and 630B move perpendicular to the movement of the UAV supports 630C and 630D. Moreover, the UAV supports 630A and 630B may overlap the UAV supports 630C and 630D so that the supports do not conflict or contact one another. In this way, among other examples, the UAV supports 630A and 630B may be configured at a higher elevation above the charging pad 605 than the UAV supports 630C and 630D. In some examples, the gears 634A and 634B may be larger in diameter than the gears 634C and 634D so that the rollers 632A and 632B are above the rollers 632C and 632D. Other ways to configure the UAV supports 630A-D and components thereof will be apparent to one of ordinary skill in the art.

Figure 6B:
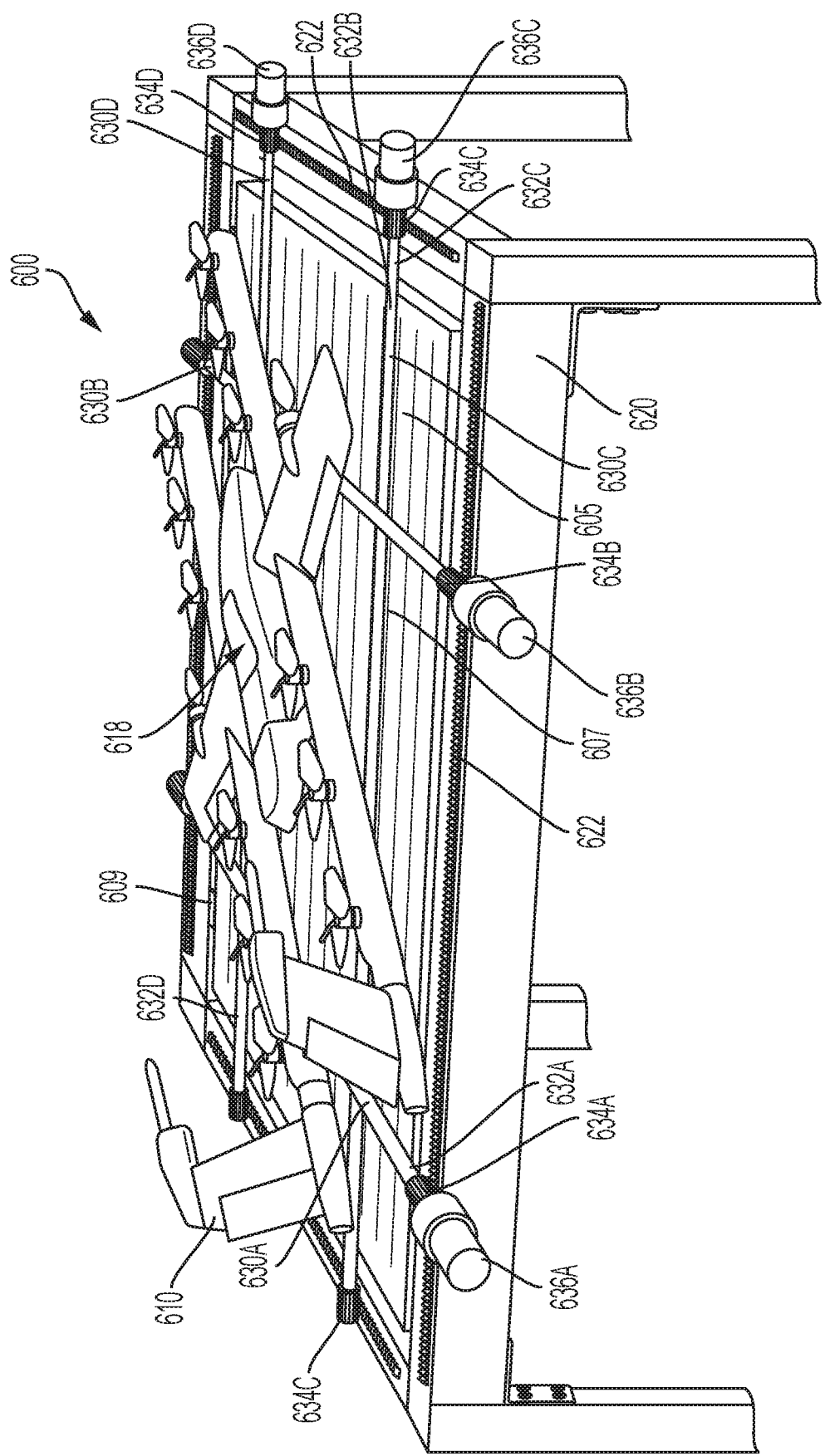
FIG. 6B illustrates a UAV on a landing pad with a plurality of UAV supports, according to an example embodiment.

Continuing to FIG. 6B, the UAV supports 630A-B are shown translating across the support structure from the first position. For example, UAV support 630A and UAV support 630 B are closer to one another in FIG. 6B than in FIG. 6A. As shown, there are four UAV supports 630A-D, and each of the four UAV supports 630A-D are moving in a different direction. In other words, each of the UAV supports 630A-D are moving towards the UAV 610. The motors 636A-D are driving the gears 634A-D along the tracks 622 such that the rollers 632A-D are moving towards the UAV 610.

In some examples, the plurality of UAV supports 630A-D includes a first pair of UAV supports 630A-B that move in opposite directions to one another, and a second pair of UAV supports 630C-D that move in opposite directions to one another. Moreover, the first pair of UAV supports 630A-B may be perpendicular to the second pair of UAV supports 630C-D. For example, as depicted, the UAV support 630A moves in an opposite direction compared to the UAV support 630B when moving towards the UAV 610. Similarly, the UAV support 630C moves in an opposite direction compared to the UAV support 630D when moving towards the UAV 610. In addition, the UAV supports 630A and 630B are arranged perpendicular to the UAV supports 630C and 630D.

Figure 6C:
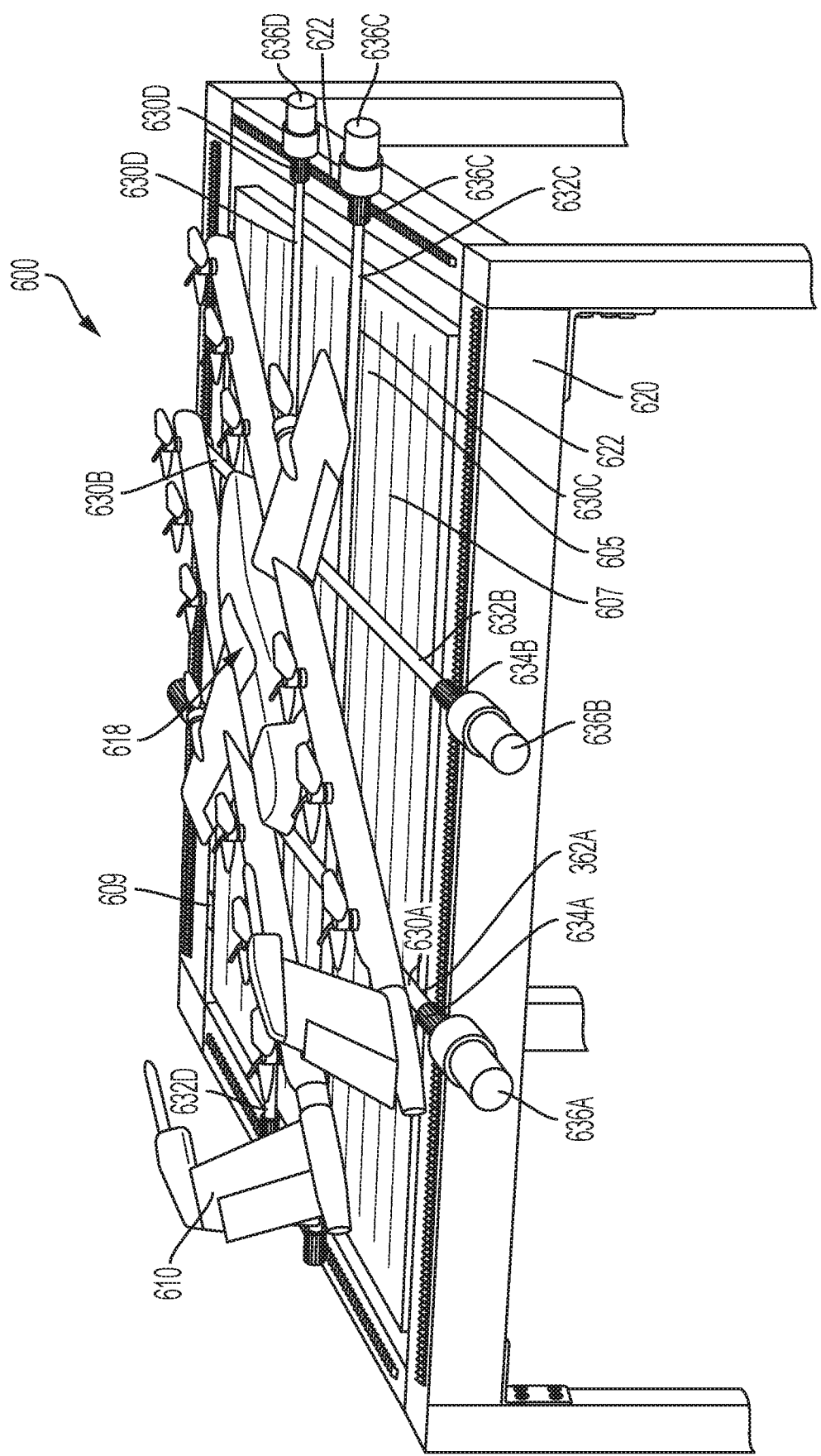
FIG. 6C illustrates a UAV supported by a plurality of UAV supports on a landing pad, according to an example embodiment.

In FIG. 6C, the UAV supports 630A-D have moved from the first position (e.g., along the periphery of the charging pad 605) to the second position. While "position" is used, it should be understood that the four UAV supports 630A-D are in a first "arrangement" when in the first position, for example. The first position may be considered when the UAV supports 630A-D are along the periphery of the charging pad 605. In other regards, the first position may be considered the position when two UAV supports, such as the pair of UAV supports 630A and 630B are spaced out from one another at a distance of more than three quarters a length or width of the landing pad 600 or charging pad 605. In even other examples, the first position may be considered the position when the UAV support 630A is furthest away from the UAV support 630B, and similarly, the UAV support 630C is furthest away from the UAV support 630D.

The second position may be considered when the UAV supports 630A-D are furthest away from the periphery of the charging pad 605. In other regards, the second position may be considered the position when two UAV supports, such as the pair of UAV supports 630A and 630B are spaced out from one another at a distance of less than one quarter a length or width of the landing pad 600 or charging pad 605. In even other examples, the second position may be considered the position when the UAV support 630A is closest to the UAV support 630B, and similarly, the UAV support 630C is closest to the UAV support 630D.

Within at least one embodiment, the UAV supports 630A-D have translated along and across at least a portion of the support structure 620 from the first position to the second position. In the second position, the UAV supports 630A-D are in contact with the UAV 610. In some examples, the UAV supports 630A-D are in contact with a fuselage 618 of the UAV 610 when the UAV supports 630A-D are in the second position. In yet a further embodiment, the UAV supports 630A-D translate across the support structure 620 until each of the UAV supports 630A-D come into contact with the UAV 610 When in the second position, the UAV supports 630A-D support the UAV 610 (e.g., maintain a vertical position of the UAV 610 relative a ground surface and/or the landing pad 600).

In some embodiments, the UAV supports 630A-D are force limited such that the UAV supports 630A-D translate along the support structure 620 until the UAV supports 630A-D contact the UAV 610, but contact with the UAV 610 causes the UAV supports 630A-D to stop moving. In other words, while the UAV supports 630A-D contact the UAV 610, the UAV supports 630A-D do not cause the UAV 610 to change positions. In this way, the UAV supports 630A-D travel to the UAV 610 no matter where the UAV 610 is on the charging pad 605. Moreover, the UAV supports 630A-D are able to contact and support the UAV 610 without requiring a closed loop control scheme (although it could). In such examples, upon activation, the UAV supports 630A-D may operate, for example, translate or move across the support structure 620, for a predetermined set of time.

In other embodiments, in addition to being force limited, or instead of being force limited, the UAV supports 630A-D are time limited or configured to move a predetermined distance along the support structure 620. In some examples, after the movement of the UAV supports 630A-D is force limited, the UAV supports 630A-D may then move for the predetermined time or distance. The UAV supports 630A-D may move a particular distance or time such that the UAV supports 630A-D contact the UAV 610 but do not contact the fuselage 618 in order to prevent possible scratching, marking, or damaging the fuselage 618. In such a case, the UAV supports 630A-D may contact a different section of the UAV 610, such as a boom or wing of the UAV 610.

In further examples, the UAV supports 630A-D are able to move the UAV 610. For example, it is contemplated that the UAV supports 630A-D can move the UAV 610 across the landing pad 600 to a specific location, or for example, may rotate the UAV 610 to a certain orientation in order to better support the loading/unloading and/or charging processes.

Figure 6D:
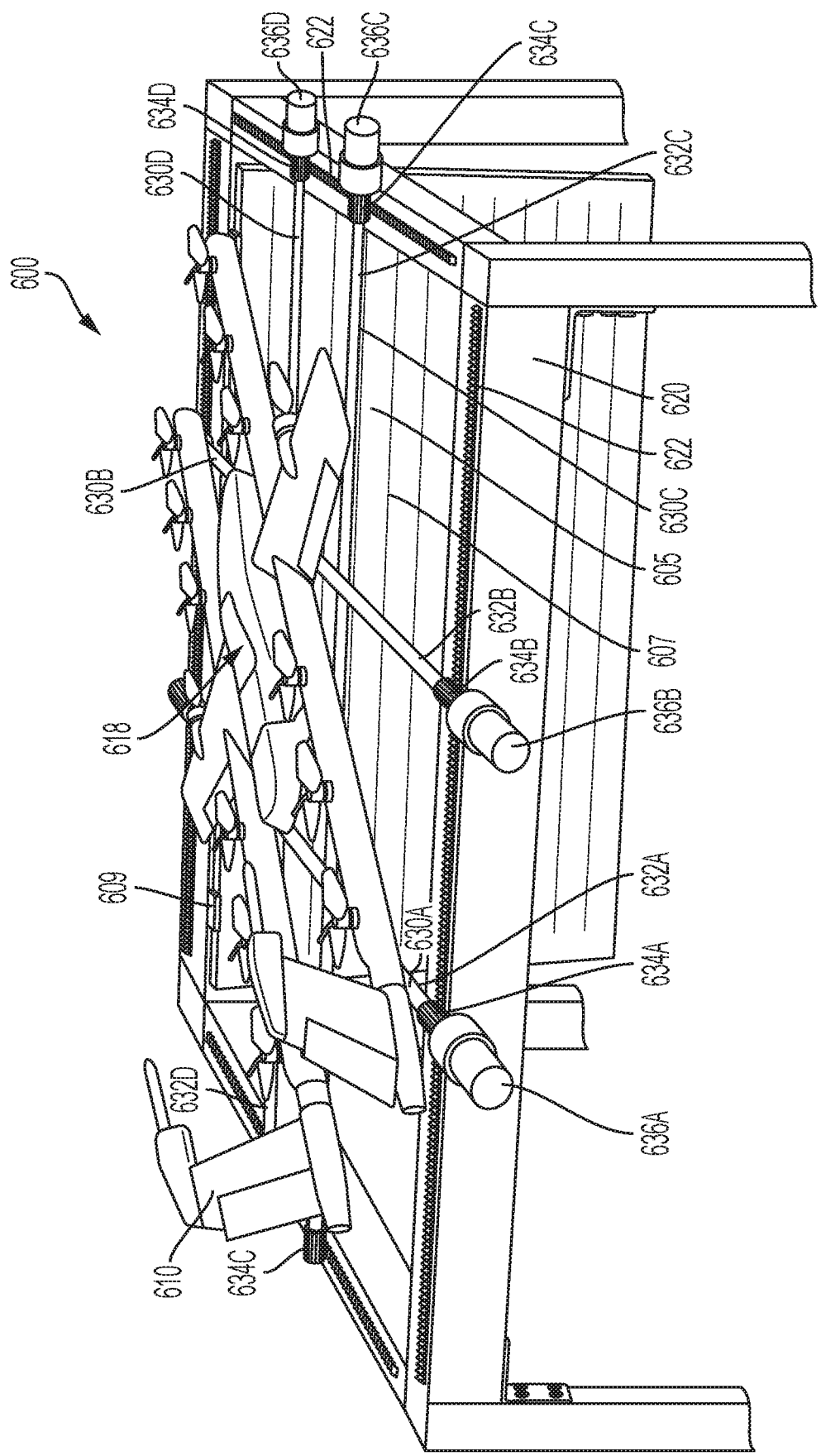
FIG. 6D illustrates a UAV supported by a plurality of UAV supports with a charging pad that has moved away from the UAV, according to an example embodiment.

Because the UAV supports 630A-D are supporting the UAV 610 when the UAV supports 630A-D are in the second position, the charging pad 605 is no longer supporting the UAV 610. As such, and as shown in FIG. 6D, the charging pad 605 may move relative to the support structure 620. In some examples, the charging pad 605 has moved away from the UAV 610. In FIG. 6D, the charging pad 605 rotates relative to the support structure 620, and particularly a top portion of the support structure 620. The charging pad 605 may include a latch(s), bracket(s), support(s) and/or the hinge(s) 609 coupled to the support structure 620 so that the charging pad 605 can be moved away from the UAV 610. In some examples, the support structure 620 may include one more motors that operate the charging pad 605. In some examples, the charging pad 605 may be biased open or closed via one or more springs or actuators positioned between the charging pad 605 and the support structure 620. After being moved away from the UAV 610, an underside of the UAV 610 is accessible.

While the charging pad 605 is rectangular in shape in FIGS. 6A-6G, it should be understood that other shapes are considered. Moreover, while a single charging pad 605 is depicted, more than one charging pad is contemplated herein (see e.g., FIG. 7). In some examples, the charging pad 605 may include at least two components that move independently of one another. In another example, there may be at least two separate charging pads that are each supported by the support structure 620. Other designs and configurations are known to people of skill in the art.

Moreover, while the charging pad 605 is shown moving away from the UAV 610, it should be understood that other similar operations are contemplated by this arrangement. For example, the charging pad 605 may be moved towards the UAV 610 in order to cause the charging pad 605 to come into contact with the UAV 610 in order to carry out an operation, such as recharge one or more batteries of the UAV 610.

Figure 6E:
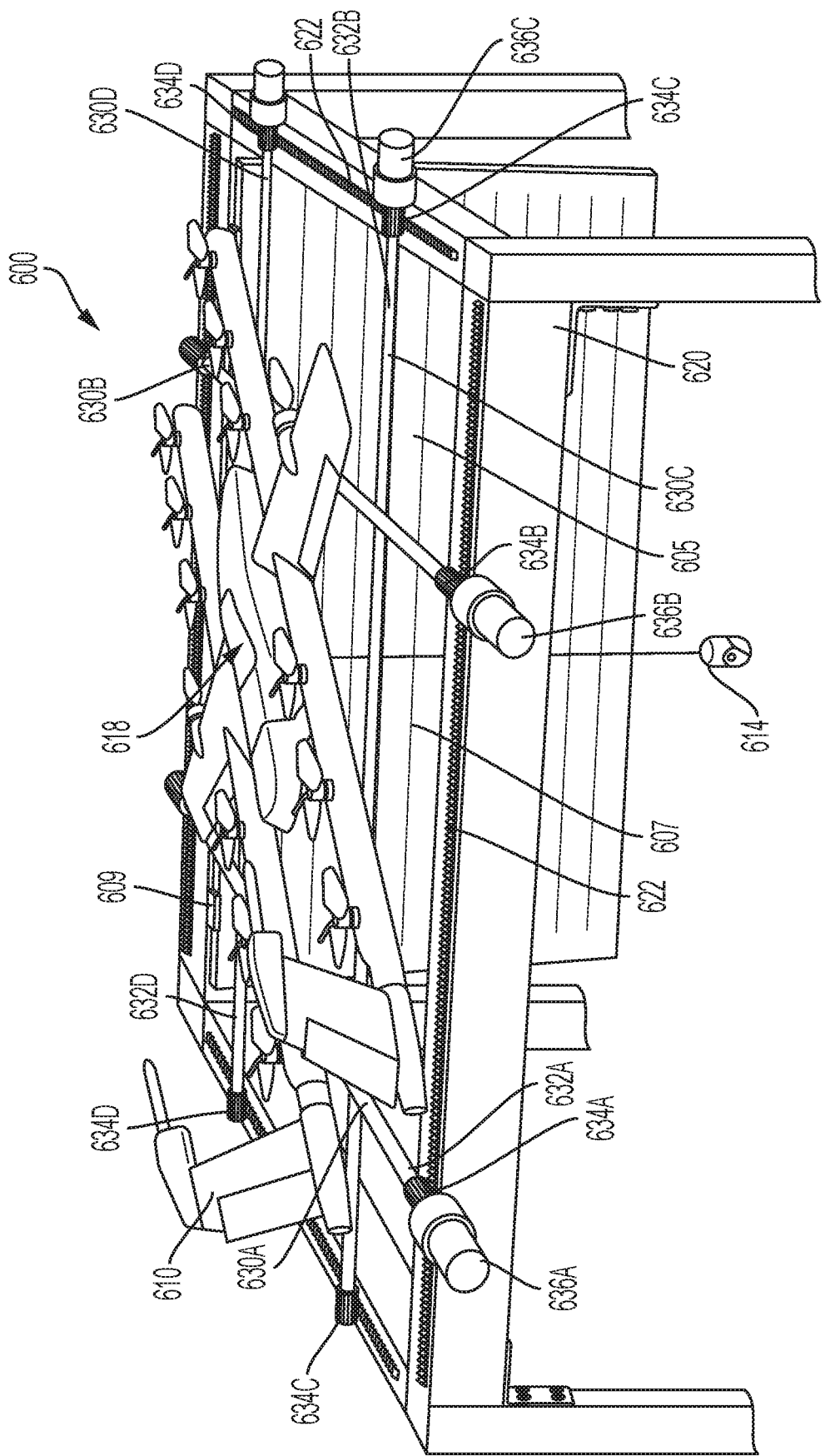
FIG. 6E illustrates a UAV supported by a plurality of UAV supports and the UAV having deployed a payload coupling apparatus, according to an example embodiment.

In FIG. 6E, the UAV 610 has payed out (or deployed) at least a portion of the retractable tether 612 including the payload coupling apparatus 614. A distal end of the tether 612 is coupled to the payload coupling apparatus 614, while a proximate end of the tether is coupled to the UAV 610. As described above, the UAV 610 may further include a winch system (not shown) that operates the tether 612. Although not shown, if the UAV 610 were making a delivery, the payload coupling apparatus 614 could be coupled to a payload and the tether 612 could be lowering the payload to be unloaded. As depicted, a payload, such as the payload 616 (see FIG. 6F) may be loaded onto the payload coupling apparatus 614 from this position. In some examples, the UAV 610 loads a payload and/or begins a loading sequence when the UAV supports 630A-D are in the second position. One or more sensors on the UAV 610 may recognize an increase in the tension of the tether 612 and register that a payload has been loaded.

In some examples, the UAV supports 630A-D may move to a third position during the loading process. For example, in preparing to lower the payload coupling apparatus 614, the UAV supports 630A-D may move apart from one another so that a cavity or spacing under the UAV 610 and between UAV Supports 630A-D is large enough to fit the payload coupling apparatus 614 and the payload 616 through the cavity. In other example, as shown in FIG. 6E, in preparing to retract the payload 616 (not shown until FIG. 6F), the UAV supports 630A-D may move apart from one another so that a cavity or spacing under the UAV 610 and between UAV Supports 630A-D is large enough to fit the payload 616 through the cavity. Nonetheless, as described above, in some examples, the payload 616 may still be loaded to the UAV 610 when the UAV supports 630A-D are in the second position. In yet another example, the UAV supports 630A-D may move to the third position when the charging pad 605 has moved away from the UAV 610.

Figure 6F:
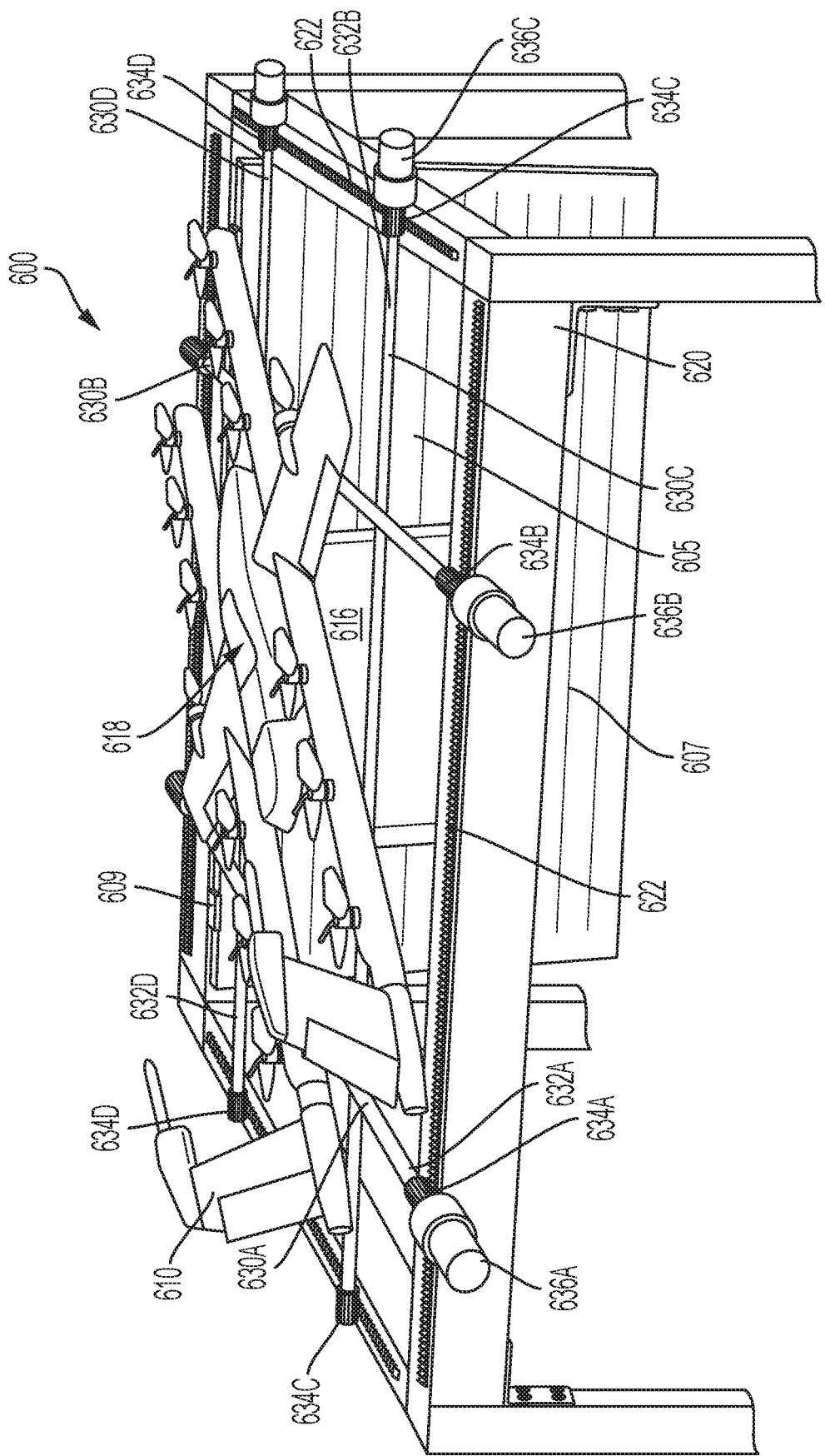
FIG. 6F illustrates a UAV supported by a plurality of UAV supports and the UAV having picked up a payload, according to an example embodiment.

Continuing to FIG. 6F, the payload 6F has been coupled to the payload coupling apparatus 614 of the UAV 610 and the UAV 610 has reeled in the tether 612 in preparation for departure from the landing pad 600. As shown in FIGS. 6E and 6F, the UAV supports 630A-D may move to the third position in preparation for accepting the payload 616. The third position may be somewhere between the first position and the second position. In the third position, the UAV supports 630A-D still support the UAV 610. However, in some examples, when in the third position, the UAV supports 630 may support the UAV 610 by contacting the UAV 610 in a different location than when the UAV supports 630 were in the second position. In some examples, the UAV supports 630A-D may not no longer be in contact with the fuselage 618 of the UAV 610, but be in contact with another portion of the UAV 610. At least some of the UAV supports 630 may be further spaced apart when in the third position such that the payload 616 fits through a cavity under the fuselage 618 of the UAV 610.

Figure 6G:
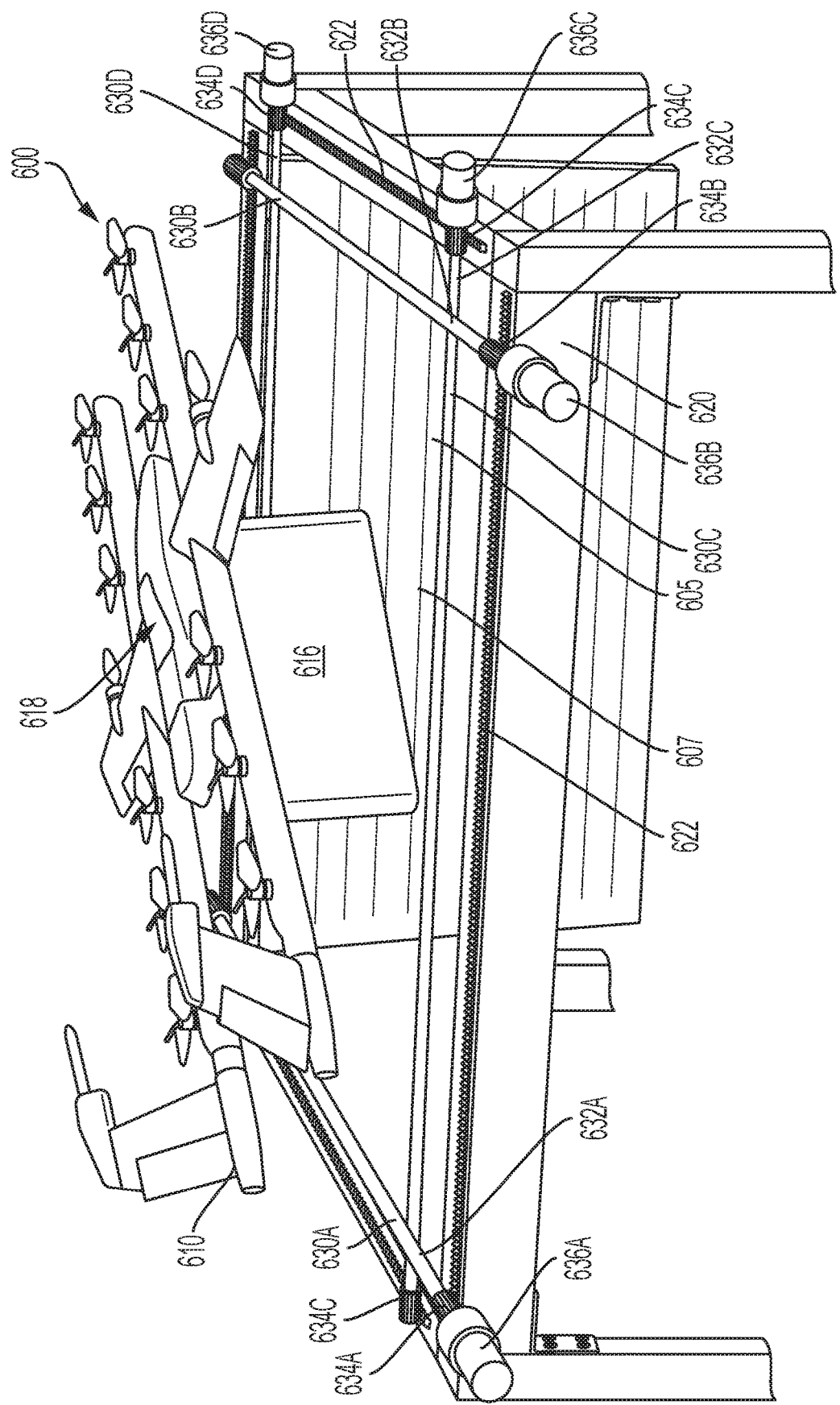
FIG. 6G illustrates a UAV departing from a landing pad, according to an example embodiment.

FIG. 6G depicts the UAV 610 departing from the landing pad 600. Upon activation of the propellers of the UAV 610, the UAV 610 may begin to hover above the landing pad 600. Moreover, upon hovering and the UAV 610 no longer being in contact with the UAV supports 630, the UAV supports 630 may return to the first position or move to a position closer to the first position. In this way, the cavity that the payload will move through under the UAV 610 becomes larger and thus it is less likely that the payload 616 contacts or conflicts with the UAV supports 630.

While the payload 616 is reeled all the way up to the UAV 610 in FIG. 6F and then the UAV departs as shown in FIG. 6G, it should be understood that in some examples the UAV 610 may begin to hover before the payload 616 is fully loaded or reeled in. For example, one loading sequence could include the payload 616 being coupled to the coupling apparatus 614, and upon sensing the payload 616 the UAV 610 may begin to hover and takeoff from the UAV supports 630A-D. The UAV supports 630A-D may be in the second position at this time. Then, once the UAV 610 is hovering, the UAV supports 630A-D may move from the second position to the third or the first position to allow the payload 616 to continue to be reeled up to the UAV 610. The UAV 610 may then load the payload 616 all the way to the fuselage 618 and depart the landing pad 600.

Again, it will be understood to a person of skill in the art that the operations described above and herein may also be executed in another order, such as a reverse order, and still function. For example, the UAV 610 may arrive with the payload 616 as shown in FIG. 6G, land as depicted in FIG. 6F, unload the payload 616 as depicted in FIG. 6E, etc.

Figure 7:
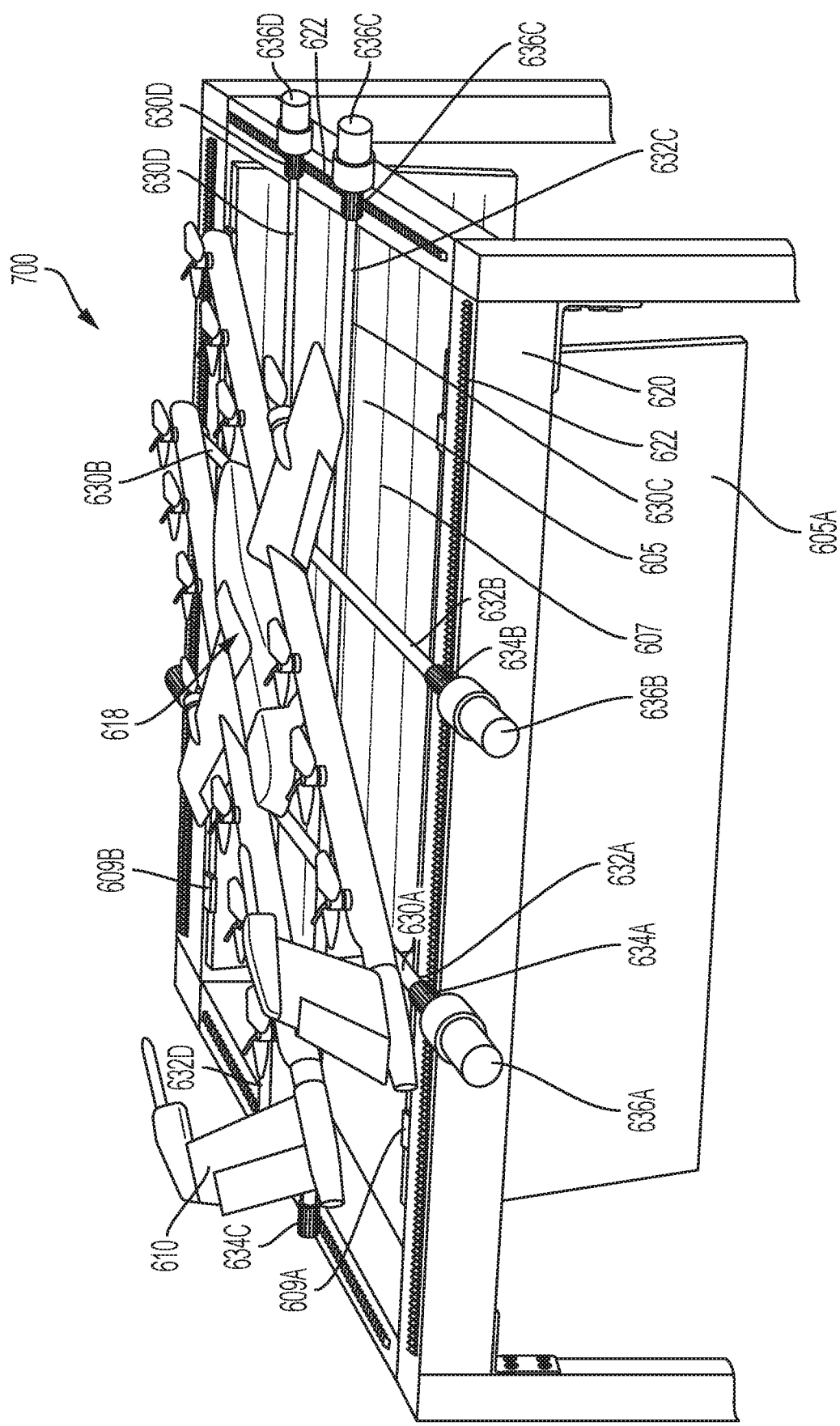
FIG. 7 illustrates a UAV supported by a plurality of UAV supports with a charging pad that has moved away from the UAV, according to an example embodiment.

FIG. 7 depicts a landing pad 700, a first charging pad 605A, a second charging pad 605B, the UAV 610, the support structure 620, and the plurality of UAV supports 630. FIG. 7 and the components shown therein may be similar in form and function to those shown in FIG. 6D. However, as shown in FIG. 7, other configurations of charging pads, such as the first charging pad 605A and the second charging pad 605B, are considered herein. As shown in FIG. 7, the two charging pads 605A and 605B may both move relative to the support structure 620. Further, each of the two charging pads 605A and 605B may be hinged and/or motorized to move relative to the UAV 610 when the UAV 610 is being supported by the UAV supports 630A-D. For example, the first charging pad 605A may be coupled to the support structure 620 via one or more hinges 609A. Similarly, the second charging pad 605B may be coupled to the support structure 620 via one or more hinges 609B. Moreover, although not depicted it should be noted that the two charging pads 605A and 605B may separately or together support the UAV 610 when the UAV supports 630A-B are in the first position.

Figure 8:
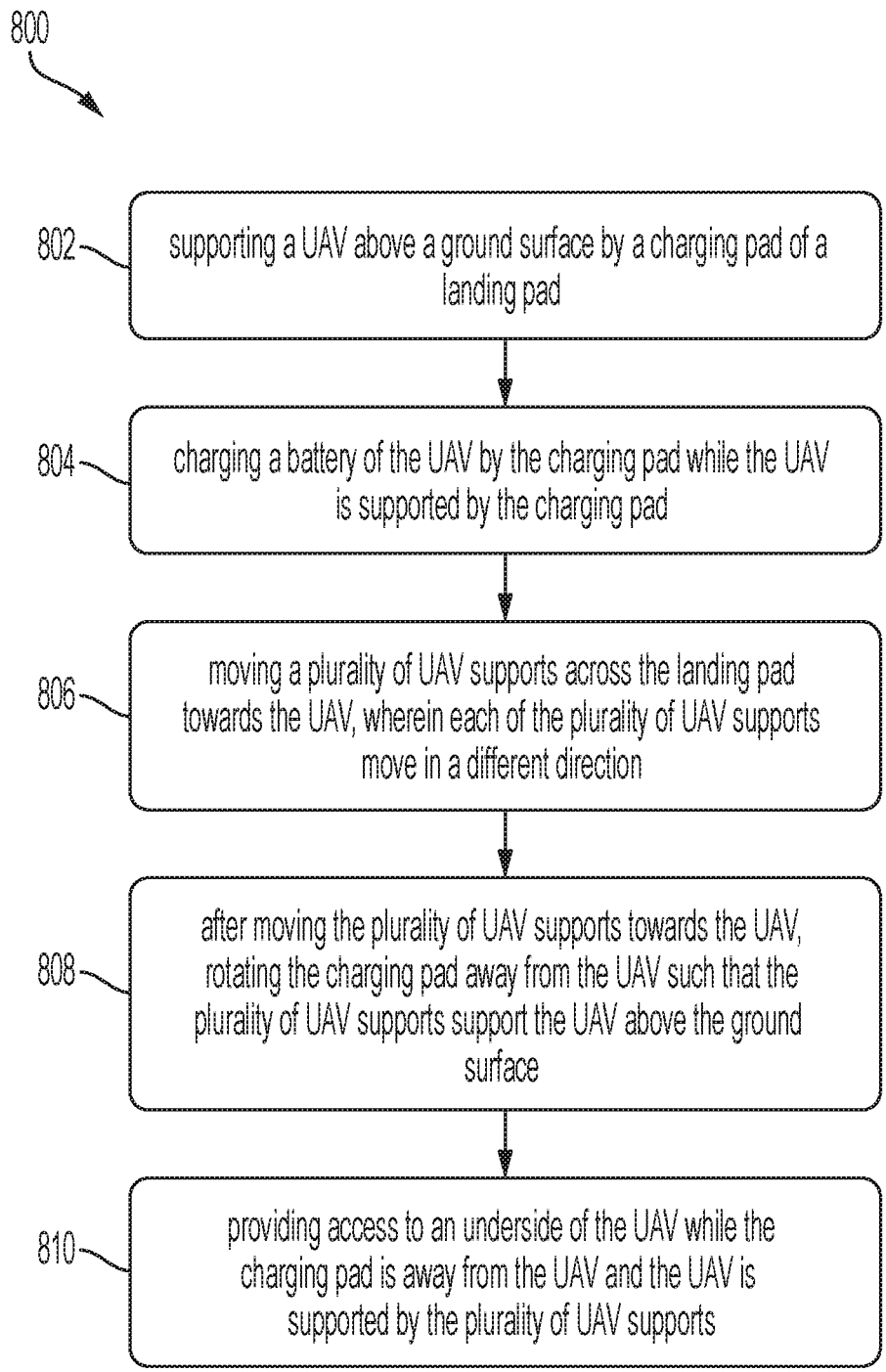
FIG. 8 is a simplified block diagram illustrating a method relating to supporting a UAV on a landing pad, according to an example embodiment.

Additionally, a method for supporting and charging a UAV is disclosed. FIG. 8 is a simplified block diagram illustrating a method 800 for supporting a UAV on a landing pad. It should be understood that example methods, such as method 800, might be carried out by one or more entities, or combinations of entities (i.e., by other computing devices, and/or combinations thereof), without departing from the scope of the invention.

For example, functions of the method 800 may be fully performed by a machine, a human operator, a computing device (or components of a computing device such as one or more processors or controllers), or may be distributed across multiple components of the computing device, across multiple computing devices, and/or across one or more servers. In some examples, the computing device may receive information from input commands initiated by an operator, sensors of the computing device, or may receive information from other computing devices that collect the information. More particularly, functions of the method 800 may be carried out by computing device(s) and/or controller(s) of a UAV, or that of a UAV system or network, or a combination thereof.

As shown by block 802, the method 800 includes supporting a UAV above a ground surface by a charging pad of a landing pad. The charging pad may be coupled to a support structure as part of a payload loading system, for example. The landing pad and payload loading system may be part of a UAV delivery system or service. The landing pad may be coupled to existing structures, or in other examples the landing pad may be installed as a new structure. The landing pad may be located at merchant terminals or modules, food trucks, warehouses, distribution centers, residences, within communities, etc., among other locations.

The UAV may have received instructions from a UAV network or system to execute an operation at or on the landing pad. For example, the UAV may be sent to the landing pad to pick up a payload for delivery. Or, in another example, the landing pad may be registered within a UAV system or network and the UAV may autonomously determine that the UAV should land to carry out a certain operation, such as charge its batteries.

As shown by block 804, the method 800 includes charging at least one battery of the UAV. In one embodiment, charging the battery of the UAV may be executed via the charging pad, and more particularly electrical contacts within the charging pad that transfer electrical power to the UAV. The UAV, including but not limited to the fuselage of the UAV may include contacts that receive the electrical power from the charging pad and route the power to one or more batteries of the UAV. Moreover, the charging pad may transfer data to the UAV via the electrical contacts.

The charging pad may provide power to the UAV automatically upon the UAV landing on the landing pad, or upon a command issued by the UAV, a user, or a UAV system/network. Moreover, the charging may stop charging the UAV upon instructions from the UAV, a user, or a UAV system/network.

As shown by block 806, the method 800 includes a plurality of UAV supports moving across the landing pad towards the UAV. In some examples the UAV supports may translate across the landing pad. The UAV supports may be similar to the UAV supports 630 described in FIGS. 6A-6G, for example. The UAV supports may each move in a different direction to reach the UAV that has landed on the charging pad. In some examples, moving the plurality of UAV supports across the landing pad towards the UAV may stop when the plurality of UAV supports come into contact with the UAV.

Instructions to the landing pad may initial the movement of the UAV supports. The UAV supports may be triggered to move based on a variety of operational scenarios. For example, the UAV supports may be automatically triggered to move based on the charging pad stopping providing electrical power to the UAV. Or the UAV supports may be triggered to move directly by the UAV upon the UAV batteries reaching a certain predetermined capacity. In other examples, upon a user approaching the landing pad to interact with the UAV (to begin the process to make or receive a delivery, for example), the UAV supports may move towards the UAV. In yet another example, the UAV supports may be instructed to move towards the UAV based on a command received from a UAV network. A variety of similar operational parameters are understood to those of skill in the art in view of the disclosure provided herein.

As shown by block 808, the method further includes moving the charging pad away from the UAV. In some examples, the movement may include a rotation of the charging pad via one or more hinges between the charging pad and the support structure. The charging pad may be moved away from the UAV after the UAV supports move towards the UAV. More particularly, the charging pad may be moved away from the UAV after the UAV supports contact and provide support to the UAV. As such, the plurality of UAV supports provide support to the UAV above the ground surface.

The charging pad and/or the support structure may receive instructions to move the charging pad away from the UAV upon confirmation that the UAV supports have come into contact with the UAV. Alternatively, the charging pad may be moved away from the UAV after a predetermined amount of time after the UAV supports were initiated to move across the landing pad.

As provided in block 810, the method 800 also includes providing access to an underside of the UAV. The underside of the UAV is accessible when the charging pad has moved away from the UAV (see block 808) and the UAV is being supported by the UAV supports and not the charging pad (see block 806).

The method 800 may include other steps not shown in FIG. 8. For example, the method 800 may include loading a payload to the UAV after the charging pad has moved away from the UAV and the UAV is supported by the plurality of UAV supports. In another example, the method 800 may include the actual landing or takeoff operations of the UAV. Thus, the method may include landing the UAV on the charging pad of the landing pad, for example.

Blocks or steps of method 800 may be controlled or initiated based on initiation of a payload loading sequence. For example, a user may initiate a pick up request with a UAV network. A UAV may then be instructed to initiate a landing operation onto the landing pad. Details of the pick up request may provide the parameters of the delivery the user is attempting to accomplish. Based on those details, the UAV may compare its current battery life against an estimated or known amount of fly time or other parameter to carry out the delivery. The UAV may determine that additional power is necessary, and thus begin accepting a charge from the charging pad of the UAV. The UAV may also exchange information (e.g., status of the UAV systems, among others) with the UAV network via being connected to the charging pad. Upon recharging its batteries to enough of a capacity to execute the delivery, the UAV may continue the loading sequence. This may trigger the UAV supports to move towards the UAV and eventually contact the UAV.

Upon the UAV supports now supporting the UAV, the charging pad may automatically or manually be moved away from the UAV such that access to the underside of the UAV is provided. Upon the underside of the UAV being accessible, the UAV may deploy its tether and payload coupling apparatus. Upon the payload coupling apparatus the UAV may wait to either automatically detect or be told that a payload has been loaded. The UAV may then reel in the payload and prepare for departure. The UAV supports may be configured to move apart from one another in order to allow for the payload to fit between the supports. The UAV may then initiate a take off operation, including taking off from the UAV supports of the landing pad.

In some examples, after loading the payload to the UAV, a takeoff of the UAV may be initiated. For example, the UAV may begin to hover above the supports. The supports may sense that the weight of UAV is no longer on the supports or the system may be commanded that the UAV is no longer being supported by the supports. Upon the supports no longer supporting the UAV, the plurality of supports may move outwards towards the support structure. In at least one embodiment, as soon as the UAV begins to hover the UAV supports may be commanded to move away from the UAV and/or towards the periphery of the landing pad or support structure such that potential conflict between the payload and the supports is reduced.

In further examples, instead of the rollers of the UAV supports being motorized, the rollers may be driven mechanically only via a mechanism that translates a downward motion or lowering motion of the charging pad into lateral motion of the UAV supports and rollers. Such an embodiment may reduce a number of electrical components and correspondingly reduce costs.

Other similar sequences (replacing/exchanging batteries or other components, unloading, other servicing, etc.) will be known to a person of skill in the art without departing from the scope of this disclosure. Moreover, means for providing, initiating, and communicating instructions for carrying out such a sequence are also considered.

In other embodiments the method 800 may include more or less blocks as well as blocks that carry out various functions described herein. Also, while the blocks are expressed in a specific order herein, other ordering of the various blocks is considered herein.

VI. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

We claim:

1. A landing pad for an unmanned aerial vehicle ("UAV"), comprising:
    a support structure;
    a charging pad coupled to the support structure such that at least a portion of the charging pad is configured to move relative to the support structure; and
    a plurality of UAV supports coupled to the support structure, wherein the plurality of UAV supports are configured to translate along the support structure from a first position to a second position, wherein when in the first position the plurality of UAV supports provide the UAV access to the charging pad and the charging pad supports the UAV, and wherein when in the second position the plurality of UAV supports support the UAV,
    wherein each of the plurality of UAV supports are force limited such that the plurality of UAV supports are configured to translate along the support structure until the plurality of UAV supports contact the UAV but do not cause the UAV to change position.

2. The landing pad of claim 1, wherein when the plurality of UAV supports are in the second position, the charging pad is configured to move away from the UAV such that an underside of the UAV is accessible.

3. The landing pad of claim 1, wherein the UAV is configured to load a payload when the plurality of UAV supports are in the second position.

4. The landing pad of claim 1, wherein the plurality of UAV supports are configured to translate along the support structure until each of the plurality of UAV supports contacts the UAV.

5. The landing pad of claim 1, wherein when in the second position, each of the plurality of UAV supports is in contact with the UAV.

6. The landing pad of claim 1, wherein the UAV is configured to land on the landing pad when the plurality of UAV supports are in the first position.

7. The landing pad of claim 1, wherein the UAV is configured to takeoff from the landing pad when the plurality of UAV supports are in a third position.

8. The landing pad of claim 1, wherein the UAV is configured to deploy a payload coupling apparatus when the plurality of UAV supports are in the second position.

9. The landing pad of claim 1, wherein the plurality of UAV supports are configured to translate along the support structure for a predetermined amount of time.

10. The landing pad of claim 1, wherein the charging pad is configured to charge a battery of the UAV when the plurality of UAV supports are in the first position.

11. The landing pad of claim 1, wherein each of the plurality of UAV supports comprises a roller, wherein the roller spans the charging pad, and wherein the roller is configured to roll along a portion of the support structure.

12. The landing pad of claim 1, wherein each of the plurality of UAV supports comprises a gear wheel coupled to a bar, wherein the bar spans the charging pad, and wherein the support structure comprises a track corresponding to the gear wheel.

13. The landing pad of claim 1, wherein the plurality of UAV supports are located along a periphery of the charging pad when in the first position.

14. The landing pad of claim 1, wherein the plurality of UAV supports comprises:
    a first pair of UAV supports that move in opposite directions to one another; and
    a second pair of UAV supports that move in opposite directions to one another, wherein the first pair of UAV supports are pendicular to the second pair of UAV supports.

15. A method, comprising:
supporting an unmanned aerial vehicle ("UAV") above a ground surface by a charging pad of a landing pad;
moving a plurality of UAV supports across the landing pad towards the UAV, wherein each of the plurality of UAV supports moves in a different direction; and
after moving the plurality of UAV supports towards the UAV, moving the charging pad away from the UAV such that the UAV is no longer supported by the charging pad and the plurality of UAV supports support the UAV above the ground surface.

16. The method of claim 15, further comprising:
loading a payload to the UAV after the charging pad has moved away from the UAV and the UAV is supported by the plurality of UAV supports.

17. The method of claim 16, further comprising:
after loading the payload to the UAV, initiating a takeoff of the UAV; and
after initiating the takeoff, moving the plurality of UAV supports away from the UAV such that the UAV is no longer supported by the plurality of UAV supports.

18. The method of claim 15, wherein the moving the plurality of UAV supports across the landing pad towards the UAV stops when the plurality of UAV supports contact the UAV.

19. A payload loading system, comprising:
an unmanned aerial vehicle (UAV) that comprises a fuselage and a retractable tether, wherein a distal end of the tether is coupled to a payload coupling apparatus, and a proximate end of the tether is coupled to the UAV; and
a landing pad, comprising:
a support structure;
a charging pad coupled to the support structure such that at least a portion of the charging pad is configured to move relative to the support structure; and
a plurality of UAV supports coupled to the support structure, wherein the plurality of UAV supports translate along the support structure from a first position to a second position, wherein when in the first position the plurality of UAV supports provide the UAV access to the charging pad and the charging pad supports the UAV, and wherein when in the second position the plurality of UAV supports are in contact with the fuselage of the UAV
wherein each of the plurality of UAV supports are force limited such that the plurality of UAV supports are configured to translate along the support structure until the plurality of UAV supports contact the UAV but do not cause the UAV to change position.

* * * * *